US012333528B2

(12) United States Patent
Narayan et al.

(10) Patent No.: US 12,333,528 B2
(45) Date of Patent: *Jun. 17, 2025

(54) MULTI-NETWORK TOKENIZATION PROCESSING

(71) Applicant: Visa International Service Association, San Francisco, CA (US)

(72) Inventors: Prasanna L. Narayan, San Ramon, CA (US); Glenn Powell, Fremont, CA (US); John Sheets, San Francisco, CA (US); Paul Tait, San Mateo, CA (US); Andrew Carpenter, Belmont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,374

(22) Filed: May 1, 2023

(65) Prior Publication Data

US 2023/0267455 A1  Aug. 24, 2023

Related U.S. Application Data

(63) Continuation of application No. 16/591,403, filed on Oct. 2, 2019, now Pat. No. 11,676,138, which is a
(Continued)

(51) Int. Cl.
*G06Q 20/38* (2012.01)
*G06Q 20/20* (2012.01)

(52) U.S. Cl.
CPC ....... *G06Q 20/38215* (2013.01); *G06Q 20/20* (2013.01)

(58) Field of Classification Search
CPC .............................................. G06Q 20/00–425
See application file for complete search history.

(56) References Cited

U.S. PATENT DOCUMENTS 5,613,012 A  3/1997  Hoffman et al.
5,781,438 A  7/1998  Lee et al.
(Continued)

FOREIGN PATENT DOCUMENTS

EP  1821249 A1  8/2007
EP  2156397 A1  2/2010
(Continued)

OTHER PUBLICATIONS

Mannan, M., 'Reducing threats from flawed security APIs: The banking PIN case,' Sep. 2009, published by Computers & Security, vol. 28, Issue 6, Sep. 2009, pp. 412-413, 418 (Year: 2009).*
(Continued)

*Primary Examiner* — Chenyuh Kuo
(74) *Attorney, Agent, or Firm* — Kilpatrick Townsend & Stockton LLP

(57) ABSTRACT

Systems, apparatuses, and methods are provided for enabling a transaction using a token associated with a first payment network to be conducted using a second payment network. When a transaction using a token is submitted to a payment network, the payment network can determine the payment network associated with the token. If the token is associated with a second payment network, a token verification request including the token can be sent to the second payment network. The second payment network can then return a token verification response including a primary account identifier such as a primary account number (PAN) corresponding to the token and a validation result. The transaction may then be processed using the primary account identifier.

16 Claims, 12 Drawing Sheets

Related U.S. Application Data continuation of application No. 14/455,574, filed on Aug. 8, 2014, now Pat. No. 10,496,986.

(60) Provisional application No. 61/935,036, filed on Feb. 3, 2014, provisional application No. 61/906,858, filed on Nov. 20, 2013, provisional application No. 61/863,863, filed on Aug. 8, 2013.

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,095,464 B2 * | 1/2012 | Patterson .............. G06Q 20/102 705/40 |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |

(56) References Cited

U.S. PATENT DOCUMENTS

| | | |
|---|---|---|
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,739,262 B2 | 5/2014 | Harper et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 8,965,811 B2 * | 2/2015 | Wankmueller ......... G06Q 20/34 705/64 |
| 9,065,643 B2 | 6/2015 | Hurry et al. |
| 9,070,129 B2 | 6/2015 | Sheets et al. |
| 9,100,826 B2 | 8/2015 | Weiss |
| 9,123,042 B2 * | 9/2015 | von Mueller ...... G06Q 20/3823 |
| 9,160,741 B2 | 10/2015 | Wentker et al. |
| 9,195,984 B1 * | 11/2015 | Spector ................ G06Q 20/367 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,342,832 B2 | 5/2016 | Basu et al. |
| 9,530,137 B2 | 12/2016 | Weiss |
| 10,096,009 B2 | 10/2018 | McGuire |
| 10,461,933 B2 | 10/2019 | Le Saint et al. |
| 10,496,986 B2 * | 12/2019 | Narayan .......... G06Q 20/38215 |
| 10,509,779 B2 | 12/2019 | Chipman |
| 11,676,138 B2 | 6/2023 | Narayan et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0061170 A1 | 3/2003 | Uzo |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0283594 A1 * | 11/2008 | Unbehagen ............ G06Q 40/00 235/380 |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennet |
| 2009/0048971 A1 | 2/2009 | Hathaway et al. |
| 2009/0070246 A1 * | 3/2009 | Tieken ................ G06Q 20/405 705/35 |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0171839 A1 * | 7/2009 | Rosano ................ G06Q 20/403 705/40 |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |

(56) References Cited

U.S. PATENT DOCUMENTS

| | | |
|---|---|---|
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197802 A1* | 8/2012 | Smith ............... G06Q 20/4016 705/44 |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0254034 A1* | 10/2012 | Statland ............... G06Q 40/02 705/44 |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0103948 A1* | 4/2013 | Baig ............... G07F 7/1075 713/176 |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |

(56) References Cited

U.S. PATENT DOCUMENTS

| | | |
|---|---|---|
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310182 A1 | 10/2014 | Cummins |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0292668 A9* | 10/2016 | Laracey ............... G06Q 20/20 |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |
| 2018/0075081 A1 | 3/2018 | Chipman |
| 2018/0268405 A1 | 9/2018 | Lopez |

FOREIGN PATENT DOCUMENTS

| | | |
|---|---|---|
| WO | 0135304 A1 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

U.S. Appl. No. 14/455,574, Final Office Action, Mailed on Feb. 19, 2019, 14 pages.

U.S. Appl. No. 14/455,574, Final Office Action, Mailed on Jul. 12, 2017, 27 pages.

U.S. Appl. No. 14/455,574, Non-Final Office Action, Mailed on May 24, 2018, 18 pages.

U.S. Appl. No. 14/455,574, Non-Final Office Action, Mailed on Jan. 27, 2017, 19 pages.

U.S. Appl. No. 14/455,574, Notice of Allowance, Mailed on Jul. 1, 2019, 8 pages.

U.S. Appl. No. 14/600,523, U.S. Patent Application No. "Secure Payment Processing Using Authorization Request", Jan. 20, 2015, 42 pages.

U.S. Appl. No. 15/008,388, "U.S. Patent Application No.", Jan. 27, 2016, 90 pages.

(56) References Cited

OTHER PUBLICATIONS

U.S. Appl. No. 15/011,366, "U.S. Patent Application No.", Jan. 29, 2016, 60 pages.
U.S. Appl. No. 15/019,157, U.S. Patent Application No. "Token Processing Utilizing Multiple Authorizations", Feb. 9, 2016, 62 pages.
U.S. Appl. No. 15/041,495, U.S. Patent Application No. "Peer Forward Authorization of Digital Requests", Feb. 11, 2016, 63 pages.
U.S. Appl. No. 15/265,282, U.S. Patent Application No. "Self-Cleaning Token Valut", Sep. 14, 2016, 52 pages.
U.S. Appl. No. 15/462,658, U.S. Patent Application No. "Replacing Token on a Multi-token User Device", Mar. 17, 2017, 58 pages.
U.S. Appl. No. 16/591,403, First Action Interview Pilot Program Pre-Interview Communication, mailed On Oct. 11, 2022, 7 pages.
U.S. Appl. No. 16/591,403, Notice of Allowance, Mailed on Feb. 2, 2023, 18 pages.
U.S. Appl. No. 16/591,403, U.S. Patent Application No. Multi-Network Tokenization Processing, Oct. 2, 2019.
U.S. Appl. No. 61/738,832, U.S. Provisional Application No. "Management of Sensitive Data", Dec. 18, 2012, 22 pages.
U.S. Appl. No. 61/751,763, U.S. Provisional Application No. "Payments Bridge", Jan. 11, 2013, 64 pages.
U.S. Appl. No. 61/879,632, U.S. Provisional Application No. "Systems and Methods for Managing Mobile Cardholder Verification Methods", Sep. 18, 2013, 24 pages.
U.S. Appl. No. 61/892,407, U.S. Provisional Application No. "Issuer Over-the-air Update Method and System", Oct. 17, 2013, 28 pages.
U.S. Appl. No. 61/894,749, "U.S. Provisional Application No.", Methods and Systems for Authentication and Issuance of Tokens in a Secure Environment, Oct. 23, 2013, 67 pages.
U.S. Appl. No. 61/926,236, "U.S. Provisional Application No.", Methods and Systems for Provisioning Mobile Devices With Payment Credentials and Payment Token Identifiers, Jan. 10, 2014, 51 pages.
U.S. Appl. No. 62/000,288, "U.S. Provisional Application No.", Payment System Canonical Address Format, May 19, 2014, 58 pages.
U.S. Appl. No. 62/003,717, "U.S. Provisional Application No.", Mobile Merchant Application, May 28, 2014, 58 pages.
U.S. Appl. No. 62/024,426, "U.S. Provisional Application No.", Secure Transactions Using Mobile Devices, Jul. 14, 2014, 102 pages.
U.S. Appl. No. 62/037,033, "U.S. Provisional Application No.", Sharing Payment Token, Aug. 13, 2014, 36 pages.
U.S. Appl. No. 62/038,174, "U.S. Provisional Application No.", Customized Payment Gateway, Aug. 15, 2014, 42 pages.
U.S. Appl. No. 62/042,050, "U.S. Provisional Application No.", Payment Device Authentication and Authorization System, Aug. 26, 2014, 120 pages.
U.S. Appl. No. 62/053,736, "U.S. Provisional Application No.", Completing Transactions Without a User Payment Device, Sep. 22, 2014, 31 pages.
U.S. Appl. No. 62/054,346, "U.S. Provisional Application No.", Mirrored Token Vault, Sep. 23, 2014, 38 pages.
U.S. Appl. No. 62/103,522, "U.S. Provisional Application No.", Methods and Systems for Wallet Provider Provisioning, Jan. 14, 2015, 39 pages.
U.S. Appl. No. 62/108,403, "U.S. Provisional Application No.", Wearables With NFC HCE, Jan. 27, 2015, 32 pages.
U.S. Appl. No. 62/117,291, "U.S. Provisional Application No.", Token and Cryptogram Using Transaction Specific Information, Feb. 17, 2015, 25 pages.
U.S. Appl. No. 62/128,709, "U.S. Provisional Application No.", Tokenizing Transaction Amounts, Mar. 5, 2015, 30 pages.

* cited by examiner

| | |
|---|---|
| Token 402 | 4900 0000 0000 0001 |
| Primary Account Number 404 | 4147 0900 0000 1234 |
| Token Requestor Identifier 406 | 11 2345 6789 |
| Token Presentment Mode 408 | QR Code |
| Token Type 410 | Dynamic |
| Token Expiration Date 412 | 7/31/2014, 14:35:00 |
| Merchant Restrictions 414 | Merchant Category Code: 5111 |
| Token Assurance Level 416 | Issuer Authenticated |
| Token Timestamp 418 | 7/30/2014: 14:35:00 |
| Token Status 420 | Active |
| Consumer Account Details 422 | Jane Doe, 123 Street, A City - 99998 |

*FIG. 4*

| Field Name | | PAN based value | TOKEN based value |
|---|---|---|---|
| Account Identifier | | PAN | Token value (16 digits) |
| | | 4147 0900 0000 1234 | 4900 0000 0000 0001 |
| Expiry Date | | 0515 | 0515 |
| Token Presentment Mode | | Not applicable | QR Code |
| Token Requestor ID | | Not applicable | 46780123 |
| Merchant Data | | | |
| | Card Acceptor ID | 12345 | 12345 |
| | Merchant Descriptor | Merchant Name | Merchant Name |
| | MCC Code | 5072 | 5072 |
| | Merchant City | New York | New York |
| | Merchant State code | NY | NY |
| | Merchant Postal code | 12345 | 12345 |
| Dynamic Card Verification (dCVV) | | Not applicable | 123 |
| Application Cryptogram | | Card Generated for CHIP transaction | Device generated for CHIP transaction |
| Issuer Discretionary Data | | Available in Track 2 | Token Issuer / Card Issuer |
| Assurance Level Code | | Not applicable | 1 - Issuer authenticated |

*FIG. 7*

MULTI-NETWORK TOKENIZATION PROCESSING

CROSS-REFERENCES TO RELATED APPLICATIONS

The present application is a continuation of U.S. patent application Ser. No. 16/591,403, filed on Oct. 2, 2019, which is a continuation of U.S. patent application Ser. No. 14/455,574, filed on Aug. 8, 2014, which is a non-provisional application of and claims priority to U.S. Provisional Application No. 61/863,863, filed on Aug. 8, 2013, U.S. Provisional Application No. 61/906,858, filed on Nov. 20, 2013, and U.S. Provisional Application No. 61/935,036, filed on Feb. 3, 2014, the entire contents of which are hereby incorporated by reference for all purposes.

The present application is related to the subject matter of U.S. Non-Provisional application Ser. No. 14/340,464, the entire contents of which are hereby incorporated by reference for all purposes. The above-referenced applications are assigned to the same assignee as the present application.

BACKGROUND

In a traditional electronic payment transaction, such as a credit card transaction, a consumer's primary account number (PAN) is exposed to various entities involved in processing the transaction. For example, the PAN may pass through a merchant terminal, a merchant processor, an acquirer system, a payment processing network, and/or other entities.

Because the consumer's PAN can be exposed to multiple entities during a transaction, some have suggested that a payment "token" be used to conduct a payment transaction. A token serves as an additional security layer to the PAN and in effect becomes a proxy/surrogate to the PAN and may be used in place of PAN while submitting transactions. The use of payment tokens instead of PANs can reduce the risk of fraudulent activity since the consumer's real PAN is never exposed. It can also reduce or eliminate the need for merchants and other entities to be compliant with the Payment Card Industry Data Security Standard (PCI DSS). PCI DSS is a standard that organizations, such as online retailers, must follow when storing, processing and transmitting sensitive payment data.

While conventional efforts to use payment tokens have been successful, a number of additional problems need to be solved. For example, conventional PANs often include routing information in the form of a six digit bank identification number (BIN). However, because a consumer's PAN is not apparent from a corresponding token, it may be difficult to identify the source of the token or the issuer of the token. However, it is often necessary to know the source or issuer of the token to route a transaction using the token appropriately.

Particularly complicating matters is the requirement of some payment processing networks to process transactions for consumers associated with another payment processing network. For example, a consumer using a MasterCard™ Debit Card may use Visa's payment processing network (i.e., VisaNet™) to conduct a payment transaction, or vice-versa. In such cases, the appropriate routing for a transaction may not be readily apparent to the payment network processing the transaction.

Embodiments of the invention address these and other problems, individually and collectively.

BRIEF SUMMARY

Embodiments of the invention generally relate to systems and methods for enabling a transaction using a token associated with a first payment network to be conducted using a second payment network.

For some embodiments, a method is disclosed comprising receiving, by a server computer at a first payment network, an authorization request message for a transaction including a token and transaction data, identifying a network token system associated with the token based on a predetermined issuer identifier of the token, the network token system being operated by a second payment network, sending a token verification request to the network token system of the second payment network, the token verification request including the token and the transaction data, wherein the network token system of the second payment network determines a primary account identifier associated with the token and validates the use of the token for the transaction, receiving a token verification response message including a primary account identifier and a validation result, and sending a modified authorization request message including the primary account identifier, the validation result, and the transaction data to an issuer of the account.

For some embodiments, a server computer is disclosed. The server computer comprises a processor and a non-transitory computer-readable storage medium comprising code executable by the processor for implementing a method comprising receiving an authorization request message for a transaction including a token and transaction data, identifying a network token system associated with the token based on a predetermined issuer identifier of the token, the network token system being operated by a second payment network, sending a token verification request to the network token system of the second payment network, the token verification request including the token and the transaction data, wherein the network token system of the second payment network determines a primary account identifier associated with the token and validates the use of the token for the transaction, receiving a token verification response message including a primary account identifier and a validation result, and sending a modified authorization request message including the primary account identifier, the validation result, and the transaction data to an issuer of the account.

For some embodiments, a method is disclosed comprising receiving, by a server computer associated with a second payment network, a token verification request message from a first payment network, the token verification request including a token and transaction data, wherein the second payment network is associated with a predetermined issuer identifier of the token, determining a primary account identifier associated with the token, validating whether the use of the token for the transaction is authorized to determine a validation result, and sending a token verification response message including the primary account identifier and the validation result, wherein the primary account identifier, the validation result, and the transaction data are provided to an issuer of the account.

BRIEF DESCRIPTION OF THE DRAWINGS

FIG. 4 shows an example of an entry in a token registry database according to an embodiment of the invention.

FIG. 7 shows a table illustrating exemplary fields for an authorization request message with PAN based values and token based values according to one embodiment of the invention.

DETAILED DESCRIPTION

Figure 1:
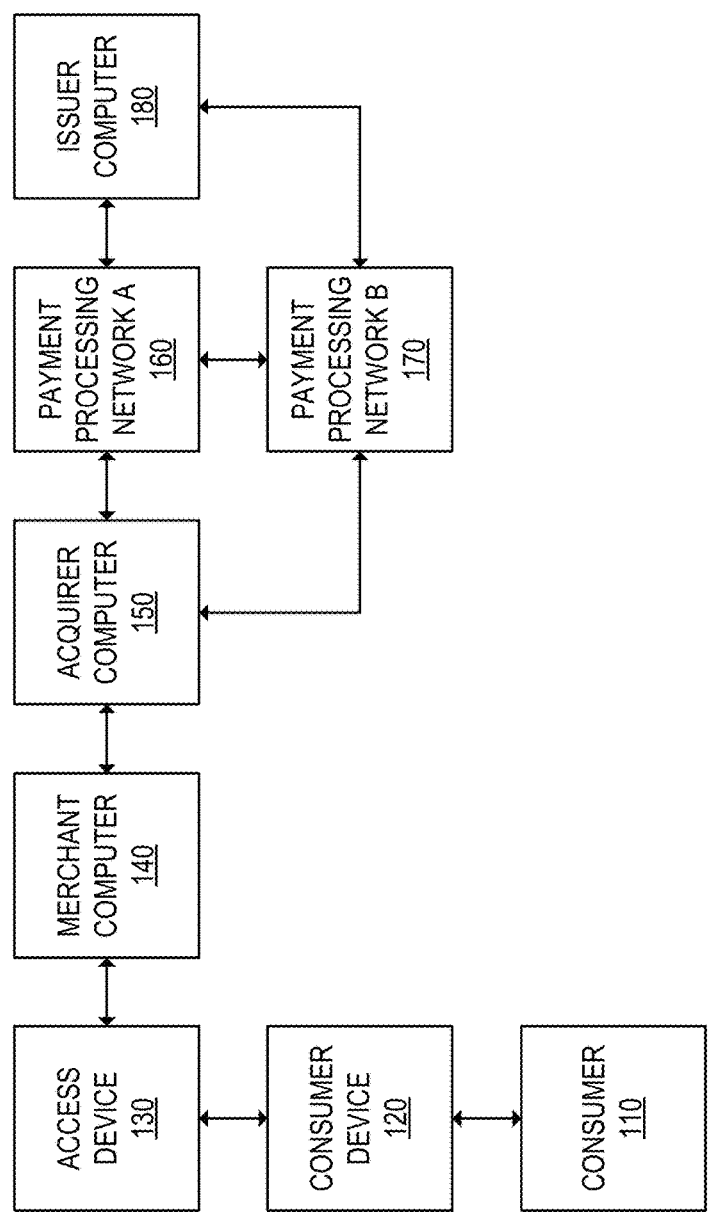
FIG. 1 shows a block diagram of a transaction processing system for electronic payment transactions using issuer accounts in accordance with some embodiments of the invention.

Embodiments of the invention generally relate to systems and methods for enabling a transaction using a token associated with a first payment network to be conducted using a second payment network.

Prior to discussing embodiments of the invention, description of some terms may be helpful in understanding embodiments of the invention.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may include any identifier for a payment account that is a substitute for an account identifier. A token may include, for instance, a series of alphanumeric characters that may be used as a substitute for an original account identifier. For example, a token (e.g., "4900 0000 0000 0001") may be used in place of a primary account identifier or primary account number (PAN) (e.g., "4147 0900 0000 1234"). In some embodiments, a token may be "format preserving; it may have a numeric format that conforms to the account identifiers used in existing payment processing networks (e.g., a 16-digit numeric identifier as used with the ISO 8583 financial transaction message format). In some embodiments, the token may comprise the same elements in the same order as a PAN; that is, the token may comprise a 6-digit real issuer identifier such as a bank identification number (BIN) that identifies the issuer of the account, followed by a 9-digit account identifier, and ending with a Luhn check digit. In other embodiments, the token may be of the same size as a PAN, but may include different elements or differently sized elements. For example, the token may include an 8-digit token issuer identifier (e.g., a token BIN) followed by an 8-digit token account identifier. In some embodiments, a token can be used in place of a PAN to initiate, authorize, settle or resolve a payment transaction or represent the original account identifier in other systems where the original account identifier (e.g., a PAN) would typically be used. In some embodiments, a token may pass the basic validation rules of an account number including, for example, a Luhn check or checksum validation that may be set up by different entities with the payment system.

In some embodiments, a token value may be generated such that the original PAN or other account identifier associated with the token value may not be computationally derived solely from the token. For example, a token may comprise a randomly generated value associated with an original PAN in a lookup table, so that the token cannot be decrypted, reformatted, or otherwise reverse-engineered to determine the original PAN. Rather, in some embodiments, direct or indirect knowledge of the lookup table may be the only way to determine the original PAN corresponding to the token. In some embodiments, an entity that maintains the aforementioned lookup table may be referred to as a "token vault."

A "token format" may include any structure, format, or other pattern which tokens used in a system may conform to. For example, in one embodiment, a token format may provide for a 16-digit token, wherein the token may be a concatenation of one or more identifiers.

The token format can be configured to allow an entity receiving a token to identify it as a token and recognize an entity that issued the token (e.g., an account issuer or payment network) and/or the entity that maintains the association between the token and the original account identifier (e.g., a token vault). For instance, the format of the token may include a "token issuer identifier" that allows an entity to identify an issuer. In some cases, the token issuer identifier may be associated with a "real issuer identifier" of the original account identifier in order to support the existing payment flow. For example, tokens generated from a PAN may have a token issuer identifier corresponding to the bank identification number (BIN) of the PAN. In various embodiments, the token issuer identifier may be the same or a different number of digits than the issuer identifier of the original account identifier, and may be static or dynamic. For example, if the original PAN includes a BIN of 412345, the corresponding token issuer identifier may be 528325 and this number may be static for all tokens issued from or for that issuer.

A "token issuer identifier range" (e.g., token BIN range) may indicate any set or range of token issuer identifiers associated with the same issuer and/or the same issuer identifier. One or more token issuer identifier ranges can be associated with the same issuer identifier (e.g., a BIN that appears in an original PAN). For example, a token issuer identifier range "49000000"-"49000002" may be associated with a BIN of "412345." In some embodiments, the token issuer identifier range and allocation can have the same format and definition of the existing BIN routing table format used by relevant entities in the payment processing system. In some embodiments, the token issuer identifier ranges may be used to generate a payment token and may not be used to generate a non-payment token. As such, the non-payment tokens may comprise different token issuer identifiers or may not comprise token issuer identifiers. In some embodiments, a token issuer identifier range may have the same attributes as the associated issuer card range and can be included in an token routing table (e.g., token issuer identifier routing table). The token routing table may be provided to the relevant entities in the payment system (e.g., merchants and acquirers).

In some embodiments, tokens may be device-specific such that each device associated with an account may be provisioned with a particular token. As such, if a transaction uses a token that is initiated by a different device than the device that the token was provisioned into, the transaction may be fraudulent. Accordingly, device information may be stored in the token vault and used to ensure that the device used in a transaction is associated with the token that is being used in the transaction. Additionally, because each token may be associated with a single device, one PAN or account may have multiple tokens associated with it, where each PAN may have a different token for the different devices that may be used to initiate a transaction associated with the PAN using a specific token. This provides additional security for transactions because network token systems have additional information to validate in order to control the use of sensitive information in a transaction processing system.

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

The token presentment mode may include any identifier or method for indicating the mode through which a token is provided. For example, the token presentment mode may include a number associated with a particular type of transaction (e.g., 5 for NFC transaction, 3 for QR Code, etc.). Further, in some embodiments, the token presentment mode could be provided through a type of cryptogram or other dynamic data generated for a transaction. For example, each type of transaction presentment mode may have a different cryptogram algorithm associated with that type of presentment mode (e.g., NFC vs. QR Code), and the type of cryptogram used by be determined during validation of the cryptogram. Additionally, a token presentment mode may be provided by a mobile device or may be populated by a merchant access device (e.g., a POS terminal) or other entity within the transaction processing system (e.g., acquirer computer, merchant processor, etc.).

"Tokenization" is a process by which data is replaced with substitute data. For example, a payment account identifier (e.g., a primary account number (PAN)) may be tokenized by replacing the primary account identifier with a substitute number that may be associated with the payment account identifier. Further, tokenization may be applied to any other-information which may be replaced with a substitute value (i.e., token).

"Token exchange" or "de-tokenization" is a process of restoring the data that was substituted during tokenization. For example, a token exchange may include replacing a payment token with an associated primary account number (PAN) that was associated with the payment token during tokenization of the PAN. Further, de-tokenization or token exchange may be applied to any other information. In some embodiments, token exchange may be achieved via a transactional message, such as an ISO message, an application programming interface (API), or another type of web interface (e.g., web request).

A "requestor" may be an application, a device, or a system that is configured to perform actions associated with tokens. For example, a requestor can request registration with a network token system, request token generation, token activation, token de-activation, token exchange, other token life-cycle management related processes, and/or any other token related processes. A requestor may interface with a network token system through any suitable communication networks and/or protocols (e.g., using HTTPS, simple object access protocol (SOAP) and/or an extensible markup language (XML) interface). Some non-limiting examples of a requestor may include third party wallet providers, issuers, acquirers, merchants, and/or payment processing networks. A requestor may be referred to as a token requestor when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

In some embodiments, a token requestor identifier may uniquely identify the pairing of a token requestor with a token domain. As such, in some embodiments, if a token requestor may request tokens for multiple domains, the token requestor may have multiple token requestor identifiers, one for each domain.

For example, in some embodiments, a token requestor identifier may include an 11 digit numeric value assigned by the network token system and the token requestor identifier may be unique within the token registry for each entity (and each domain). For instance, the token requestor identifier may include a code for a token service provider (e.g., first 3 digits) such as the network token system and the remaining digits (e.g., last 8 digits) may be assigned by the token service provider for each requesting entity (e.g., mobile wallet provider) and for each token domain (e.g., contactless, e-commerce, etc.).

In some embodiments, a token requestor identifier may be used in a transaction during authorization processing. For example, a token requestor identifier may be passed through a transaction request message to validate that the entity that is initiating the transaction is the same as the entity that requested and manages the token. In some embodiments, an entity (e.g., digital or mobile wallet provider, merchant, merchant of record, payment enabler, etc.) can be assigned a token requestor identifier during an on-boarding or registration process. In some embodiments, an acquirer/acquirer processor/payment enabler (i.e., payment service provider) may populate the token requestor identifier for each merchant, mobile wallet provider, consumer, etc. into the authorization message field prior to submitting the authorization request message to a payment processing network.

Embodiments of the invention provide several advantages. For example, embodiments enable multiple payment networks, each of which may generate tokens and/or maintain a network token system, to process transactions using tokens associated with another payment network. There are many situations in which such a scenario may occur. For example, a consumer associated with a first payment network (e.g., Visa™) may desire to conduct a transaction with a merchant that can only process transaction using a second payment network (e.g., MasterCard™). In addition, in some cases, a merchant may desire to route a transaction using the payment network with the lowest cost (e.g., the lowest interchange rate).

In some cases, transactions conducted using a primary account number (PAN) may be routed using a bank identification number (BIN). For example, a payment network may maintain a BIN routing table, wherein each BIN may be mapped to an issuer associated with the BIN, so that the payment network may forward the transaction to the appropriate issuer for processing. The issuer may then use the received PAN to retrieve account information and approve or decline the transaction. However, a payment token might not include a BIN. Further, if the token is associated with a different payment network, a payment network may not be able to retrieve the original PAN and BIN. Thus, appropriate routing for a transaction using a token may not be readily apparent to a payment network. Furthermore, in many cases, an issuer may not know the original PAN corresponding to a token. Thus, even if the transaction was routed to the correct issuer, the issuer may not be able to process the transaction.

Embodiments of the invention address these issues by enabling payment networks to process transactions using tokens associated with different payment networks. For example, in some embodiments, once a transaction using a token is received by a first payment network, a token routing table may be used to identify which payment network the token is associated with. If the token is associated with a second payment network, a token verification request message may be sent to the second payment network. Subsequently, an original PAN associated with the token may be returned in a token verification response message. The first payment network may can then use the BIN of the original PAN to route the transaction and provide the PAN to the issuer to approve or decline the transaction.

Embodiments of the invention further improve security by allowing the second payment network to validate the token verification request sent by the first payment network. For example, in some cases, the second payment network may a verify that the token requestor is authorized to request the original PAN associated with the token, or may validate a PIN provided with the transaction. More generally, the second payment network may provide additional security for the transaction using data using that may not be available to the payment network that is processing the transaction.

The above examples highlight only a few of the advantages of multi network tokenization processing in accordance with embodiments of the invention.

I. Network Token Processing Systems

FIG. 1 shows a block diagram of a typical transaction processing system 100 configured to use real issuer identifiers (e.g., bank identification numbers (BINs)) to route authorization request messages during transaction processing. For example, payment credentials issued for consumers may include real issuer identifiers (e.g., BINs) that may be used to identify the issuer (and payment processing network) associated with the account being used to initiate the transaction.

The system 100 may include a consumer 110, a consumer device 120, an access device 130, a merchant computer 140, an acquirer computer 150, a payment processing network A 160, a payment processing network B 170, and an issuer computer 180. In some implementations, different entities in FIG. 1 may communicate with each other using one or more communication networks such as the Internet, a cellular network, a TCP/IP network or any other suitable communication network. Note that one or more entities in the system 100 may be associated with a computer apparatus that may be implemented using some of the components as described with reference to FIG. 12.

The consumer 110 may be a person or individual, an organization (such as a business), or any other suitable entity. The consumer 110 may utilize the consumer device 120 to initiate a transaction with a merchant by interacting with the access device 130 (e.g., point-of-sale (POS) device).

The consumer device 120 may be associated with a payment account of the consumer 110. In some implementations, the consumer device 120 may be a mobile device such as a mobile phone, a tablet, a PDA, a notebook, a key fob or any suitable mobile device. For example, the consumer device 120 may include a wallet or a payment application that may be associated with one or more payment accounts of the consumer 110. In some implementations, the consumer device 120 may be configured to display a machine readable code (e.g., QR™ code, bar code, etc.). The consumer device 120 may also include a camera or a scanning device capable of scanning a machine readable code. In some implementations, the consumer device 120 may be capable of communicating with the access device 130 using a short range communication technology such as NFC. For example, the consumer 110 may interact with the access device 130 by tapping or waving the consumer device 120 in proximity of the access device 130. In some implementations, the consumer device 120 may be a payment card such as a credit card, debit card, prepaid card, loyalty card, gift card, etc.

The access device 130 may be an access point to a transaction processing system that may comprise the acquirer computer 150, the payment processing network A 160, and the issuer computer 180. In some implementations, the access device 130 may be associated with or operated by the merchant computer 140. For example, the access device 130 may be a point of sale device that may include a contactless reader, an electronic cash register, a display device, etc. In some implementations, the access device 130 may be configured to display transaction information in a format that may be read by the consumer device 120 (e.g., mobile phone) including a QR™ code, bar code, or any other information transfer mechanism. In some implementations, the access device 130 may be a computer (e.g., a desktop computer) that may be used by the consumer 110 to initiate a transaction with the merchant computer 140 (e.g., an online transaction).

The merchant computer 140 may be a computer associated with a merchant. The merchant computer 140 may be configured to generate an authorization request for a transaction initiated by the consumer 110 in response to receiving information from access device 130. For example, for an in-person or card present transaction, merchant computer 140 may be configured to receive account information from an access device 130 such as a card reader. For an online transaction, merchant computer 140 may be a server computer operable to receive account information entered by consumer 110 through the merchant's website.

The acquirer computer 150 may represent a traditional acquirer/acquirer processor. The acquirer is typically a system for an entity (e.g., a bank) that has a business relationship with a particular merchant, a wallet provider or another entity. The acquirer computer 150 may be communicatively coupled to the merchant computer 140 and the payment processing network 160 and may issue and manage a financial account for the merchant. The acquirer computer 150 may be configured to route the authorization request for a transaction to the issuer computer 180 via the payment processing network computer 160 and route an authorization response received via the payment processing network computer 160 to the merchant computer 140.

The payment processing network A 160 may be configured to provide authorization, clearing, and settlement services for payment transactions. The payment processing network A 160 may include data processing subsystems, wired or wireless networks, including the internet. One example of the payment processing network A 160 may include VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network A 160 may include a server computer. In some implementations, the payment processing network A 160 may forward an authorization request received from the acquirer computer 150 to the issuer computer 180 via a communication channel. The payment processing network computer A 160 may further forward an authorization response message received from the issuer computer 180 to the acquirer computer 150.

Payment processing network B 170 may be another payment processing network configured to provide authorization, clearing, and settlement services for payment transactions. In some cases, payment processing network B 170 may be associated with the consumer device 120. One example of a payment processing network B 170 may be BankNet™, operated by MasterCard®. In some cases, consumer device 120 may be branded with or otherwise associated with payment processing network B 170. In some embodiments, payment processing network B 170 may also be configured to communicate with acquirer computer 150 and issuer computer 180. For example, payment processing network B 170 may forward an authorization request message from acquirer computer 150 to issuer computer 180, and may forward an authorization response message from issuer computer 180 to acquirer computer 150.

The issuer computer 180 may represent an account issuer and/or an issuer processor. Typically, the issuer computer 180 may be associated with a business entity (e.g., a bank) that may have issued an account and/or payment card (e.g., credit account, debit account, etc.) for payment transactions. In some implementations, the business entity (bank) associated with the issuer computer 180 may also function as an acquirer (e.g., the acquirer computer 150).

Figure 2:
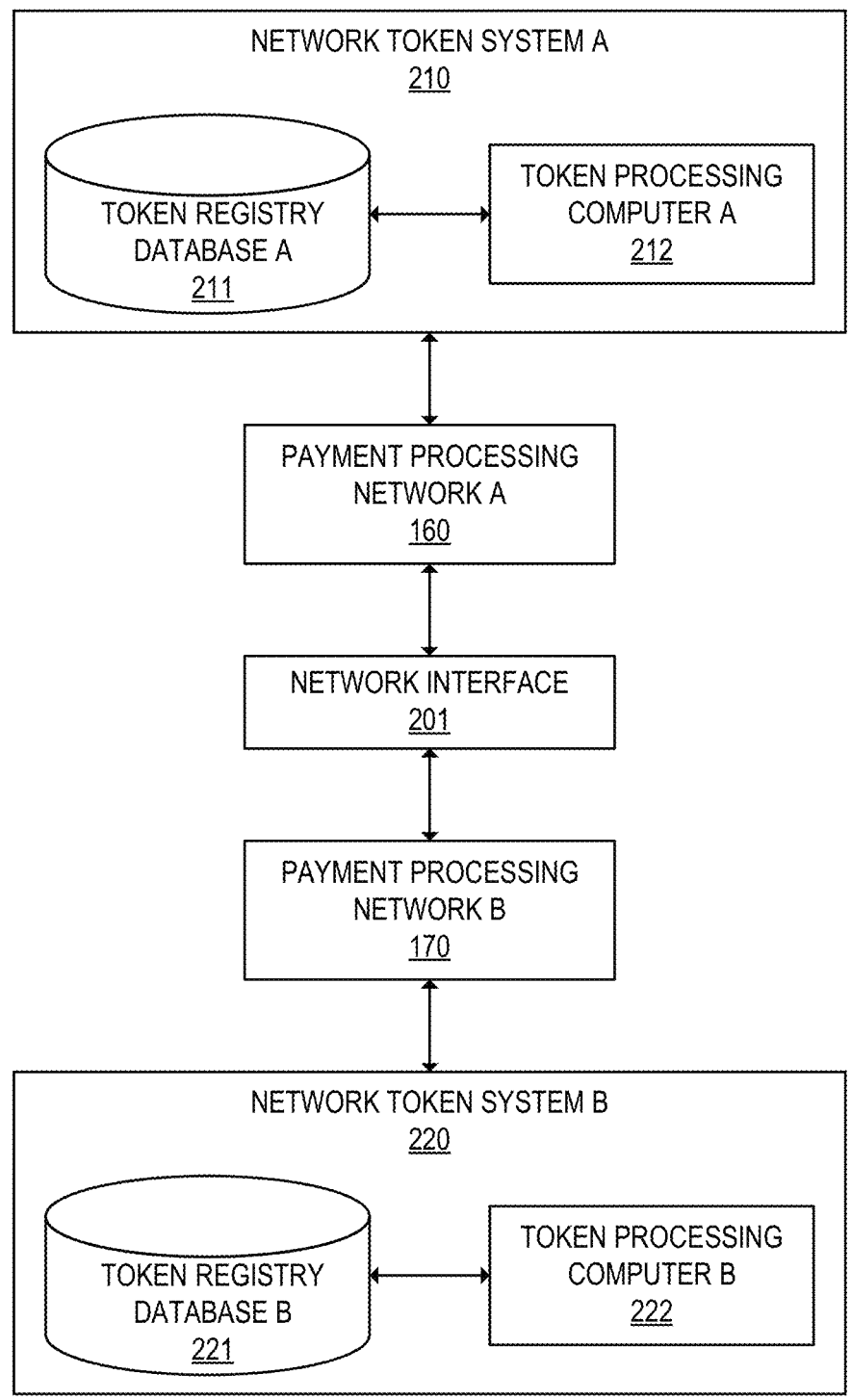
FIG. 2 shows a block diagram of two payment processing networks, each associated with a network token system, according to an embodiment of the invention.

FIG. 2 shows a block diagram of two payment processing networks 160 and 170, each associated with a network token system 210 and 220, respectively, according to an embodiment of the invention. The payment processing networks 160 and 170 may communicate using a network interface 201.

Network interface 201 may allow payment networks 160 and 170 (e.g., MasterCard®, American Express®, Discover®, etc.) to communicate with each other and with network token systems associated with the payment networks. In some embodiments, network interface 201 may include APIs for tokenization and de-tokenization services, e.g., token exchange, token routing, etc. In addition, network interface 201 may allow entities to request the original PAN associated with a token for transactions.

Network token systems 210 and 220 may each include a token registry database 211 and 221, and a token processing server computer 212 and 222, respectively. Token registry database 211 and 221 may also be referred to as "token vaults." A token registry database 211 or 221 may store and maintain issued or generated tokens as well as any other relevant information to the tokens. For example, the token registry may include a token requestor identifier and an account identifier (e.g., PAN) for each token. Token registry databases 211 and 221 and token processing computers 212 and 222 may be configured to provide services associated with the token registry including, for example, payment account registration, token generation, token issuance, token authentication and activation, token exchange, token routing, token assurance level generation, token life-cycle management, and token processing to the entities that are registered with the network token systems 210 and 220. In some embodiments, different entities can communicate with and obtain services provided by the network token system 202 using their respective interfaces with the network token system 202.

In some embodiments, network token systems 210 and 220 may interface with issuer computers 180. For example, network token systems 210 and 220 may generate tokens on behalf of issuers, or may receive tokens generated by issuers for consumers associated with the issuer.

Figure 3:
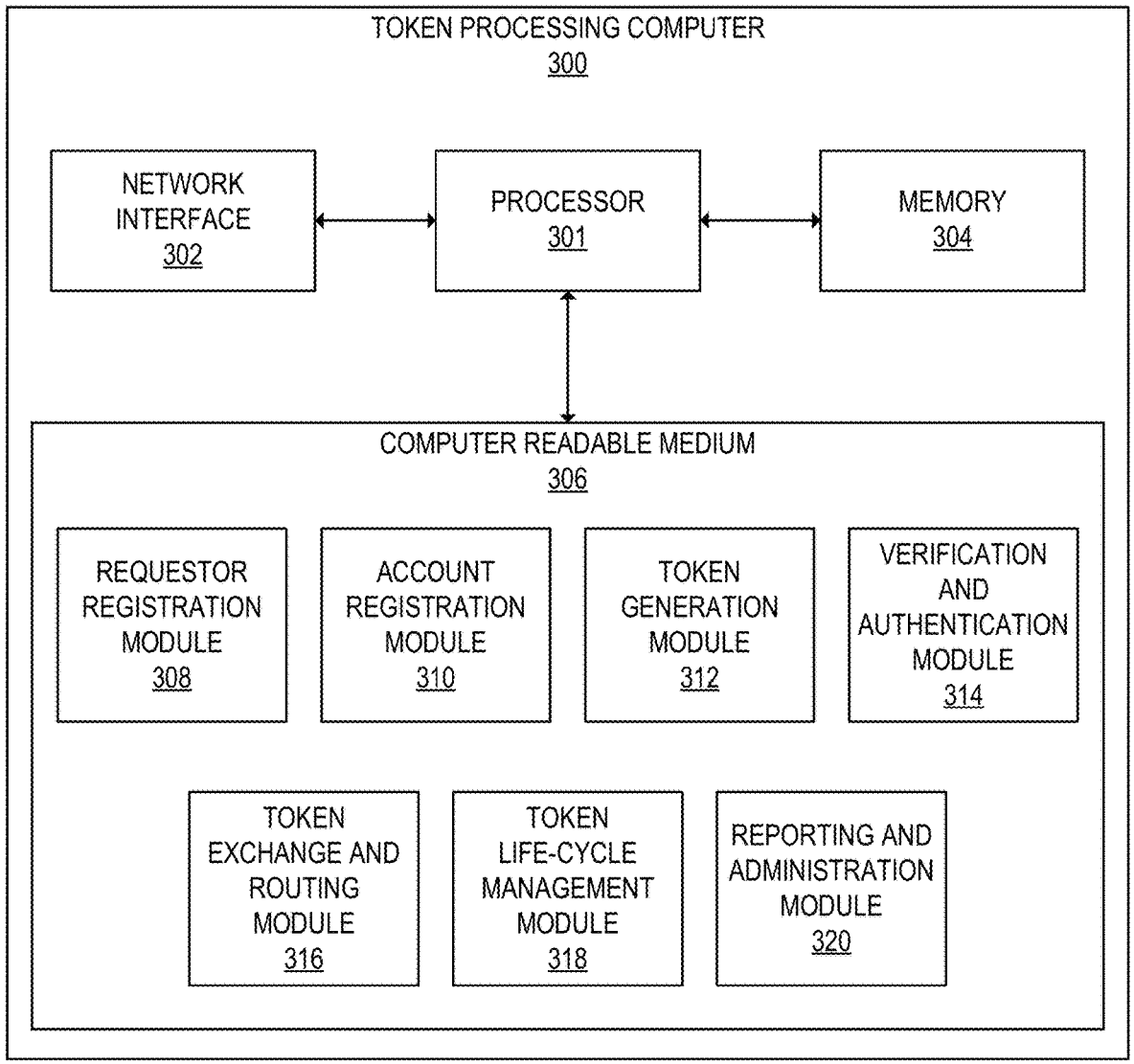
FIG. 3 shows a block diagram of a token processing server computer according to an embodiment of the invention.

FIG. 3 illustrates components of the token processing computer 300 in one embodiment of the invention. Token processing computer 300 may implement, for example, token processing computers 212 and 222 as shown in FIG. 2.

The token processing server computer 300 may include a processor 301 communicatively coupled to a network interface 302, a memory 304 and a computer readable medium 306.

The processor 301 can comprise a CPU, which comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques.

The network interface 302 may be configured to allow the network token system 202 to communicate with other entities such as the consumer device 120, merchant computer 140, acquirer computer 150, payment processing network A 160, payment processing network 170, issuer computer 180, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 304 may be used to store data. The memory 304 may be coupled to the processor 300 internally or externally (e.g., cloud based data storage) and may comprise any combination of volatile and/or non-volatile memory, for example, RAM, DRAM, ROM, flash, or any other suitable memory device.

The computer readable medium 306 may be in the form of a memory (e.g., flash, ROM, etc.) and may comprise code, executable by the processor 300 for implementing methods described herein. The computer readable medium 306 may include a requestor registration module 308, an account registration module 310, a token generation module 312, a verification and authentication module 314, a token exchange and routing module 316, a token life-cycle management module 318, and a reporting and administration module 320.

The requestor registration module 308 may comprise code which can cause the processor 300 to register a token requestor entity with a token registry database (e.g., token registry database 211 or 221) and to generate a token requestor identifier for the registered entity. Some non-limiting examples of the token requestor entities may include issuers, wallet providers, payment enablers (e.g., merchant, wallet providers or OEMs, merchants, e-commerce merchants, transit authorities, payment processing networks, acquirers, mobile devices (e.g., wallet application, payment application, etc.), or subcomponents and applications thereof. Each registered entity can use the token requestor identifier as part of each token verification request to a network token system. The token requestor identifier can then serve to identify and validate the entity. In one embodiment, the registered entity can provide requestor information to the requestor registration module 308 such as an entity name, contact information, an entity type (e.g., merchant, wallet provider, payment service provider or PSP, issuer, payment enabler, acquirer, acquirer processor, etc.), token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

The account registration module 310 may comprise code that can be used by the processor 300 to perform account registration by different entities. In some embodiments, account registration may comprise registered entities (e.g., issuers) submitting payment account information to a token processing computer 300. For example, the registered entities may provide a token requestor identifier (e.g., received at the time of registration from the requestor registration module 308), a payment account number (PAN), a CVV2, an account expiration date, consumer name and contact information, a token type, an OS type/version, and any other relevant information for individual account registration or bulk account registration. In one embodiment, the account registration module 310 may store the details of all of the consumers' account details in a corresponding token registry database (e.g., databases 212 or 222) for all successful activation and registration requests. In one embodiment, the token registry database may store a token requestor identifier, a MSISDN, a payment account number (PAN), a CVV2, an expiration date, a PAN nickname or alias, a consumer postal code, a UUID, a IMEA, an IMSI, a mobile application identifier, consumer first and last name, etc. In one embodiment, the registered entities may also communicate with account registration module 310 to unregister payment accounts by providing the necessary information to network token system. Thus, after an account is unregistered, the corresponding account information may be provided to.

The token generation module 312 may be configured to generate a token in response to a request for a token from a token requestor. In one embodiment, the token generation module 312 may receive a token requestor identifier, an account number (e.g., PAN), an expiration date and a CVV2. In some embodiments, the token generation module 312 may also receive optional information such as a consumer name, a consumer address and zip code, a requested token type (e.g., payment static, payment dynamic, non-payment, etc.), a card verification status (e.g., AVS/CVV check status), a MSISDN, a UUID, an IMEI, an OS type/version and any other suitable information. In one embodiment, the token generation module 312 may generate a token response with a token number, a token expiration date and a token assurance level. In one embodiment, the token generation module 312 may validate the token requestor identifier, determine the PAN type and generate a token from the respective token BIN ranges. The token registry database associated with token processing computer 300 may maintain the correlation between the card and the associated requestor and the token. In one embodiment, the token generation module 312 may determine if a token already exists in the token registry database corresponding to the PAN before generating a new token. In some embodiments, if a token cannot be provided, the token response may include a corresponding reason code. The token generation module 312 may also provide an interface to the token requestors to submit a bulk token request file (e.g., so that multiple PANs may be tokenized simultaneously).

In one embodiment, the tokens may be generated on-the-fly via API calls. For example, when a request is received to tokenize a PAN, the token generation module 312 may determine a token range to assign the token. For example, the token range may be assigned based on whether the issuer is provisioning the token (e.g., issuer assigned token range) or the payment processing network is provisioning the token on-behalf-of the issuer (e.g., payment processing network assigned token range). As an example, if the payment processing network assigned token range includes "442400000-442400250," then "4424000000005382" may be assigned as a token value. The token vault may store the relationship of the token range to the PAN and a token add record may be logged. In some embodiments, the token generation module 312 may consider the token range list associated with the PAN range before assigning a token.

In one embodiment, the token generation module 312 may access a token range table that represents available token ranges provisioned by the payment processing network computer 160 and token ranges have not been associated with PAN ranges. The token generation module 312 may access another table that includes minimum and maximum account ranges for the PAN and the associated token ranges. The token ranges may include the token ranges provisioned by payment processing network computer 160 or 170 and the token ranges provisioned by the issuer computer 180.

In some embodiments, the tokens may be algorithmically derived. For example, in some embodiments, an encryption process using encryption algorithms such as DES, triple DES, and AES may be used to encrypt a real PAN to create a token. In other embodiments, the tokens may not be algorithmically derivable. For instance, a token may be generated using a pseudo-random algorithm so that the token is independent of the real PAN and the association of the token to the PAN may be provided solely through the use of a lookup table.

The verification and authentication module 314 may be configured to execute a consumer verification and authentication process and determine a token assurance level based on the outcome of the verification and authentication process.

For example, the verification and authentication module 314 can perform consumer authentication and verification through a configured authentication scheme. In one embodiment, the authentication scheme may include verification of the payment account number, CVV2 and the expiration date based on the customer information stored in a database associated with the payment processing network. In one embodiment, the authentication scheme may include direct verification of the consumer by the issuer computer 180 with consumer credentials for their online banking system.

In various other embodiments, the authentication scheme may include verification of the consumer credentials through the issuer ACS (Access Control Server), such as through the use of the 3-D secure protocol by Visa®, through a payment processing network consumer authentication service (e.g., Visa™ Consumer Authentication Service (VCAS)), using a one-time password (OTP) or zero dollar authorization request message.

In some embodiments, a token assurance level may include assurance information such as an assurance indicator, an entity that performed the authentication or assurance process (e.g., requestor, network issuer, others), the date that the assurance processing was performed, a wallet/consumer device identification indicator, an assurance level score (based on authentication method used), and any other information relevant to assurance.

In some embodiments, requests to provision tokens may combine consumer authentication requests with the token request. For example, authentication may be performed prior to tokenization using any of the previously discussed authentication methods. In the authentication methods, where the issuer computer 180 performs the authentication, tokenization may be performed after receiving an authentication response from the issuer computer 180.

In some embodiments, account or card registration, token generation, and verification and authentication may be performed as part of a single token request process. In some embodiments, for bulk requests, account registration and token generation may be performed by processing a bulk file from the token requestor. In such embodiments, consumer verification and authentication may be performed in a separate step. In some embodiments, the token requestor can request that the authentication and verification process be performed independently multiple times for a particular card or account to reflect any changes to the levels of assurance for the token over time.

The token exchange and routing module 316 may comprise code, executable by the processor, to cause the processor to allow registered applications to request payment account number information for a given token. For example, payment processing networks 160 and 170, acquirer computer 150, etc., may issue a request for a token exchange during a payment transaction. In one embodiment, a registered entity can provide at least one, two or more of a token requestor identifier, a token number, a token expiration date, a token presentment mode, a transaction identifier, a transaction timestamp, a request timestamp and any other relevant information to request the payment account number information. In some embodiments, the request may be sent as a token verification request message. The token exchange and routing module 316 may then validate that the requesting entity is entitled to make a request for a token exchange, and optionally evaluate a level of risk in providing the requested account information. In one embodiment, the token exchange and routing module 316 may validate the PAN/token mapping and presentment mode based on the request timestamp and the token expiration timestamp. The token exchange and routing module 316 may retrieve the payment account number information from the token registry database 211 or 221 and provide it along with the assurance level to the requestor entity. In one embodiment, if the PAN/token mapping is not valid for the requested timestamp and presentment mode, an error message may be provided.

The token life-cycle management module 318 may comprise code, executable by the processor 300 to perform life-cycle operations. Life-cycle operations may include canceling a token, activating or deactivating a token, updating token attributes, renewing token with a new PAN expiration date, etc. In one embodiment, a token requestor entity may provide a token requestor identifier, a token number, a life-cycle operation identifier and one or more token attributes to the network token system to perform the requested life-cycle operation on the given token. The token life-cycle management module 318 may verify the token requestor identifier and the token association based on a token registry database. The token life-cycle management module 318 may perform the requested life-cycle operation on the token and update all corresponding associations in the token registry database. In some embodiments, other entities such as consumers may perform life cycle operations on tokens. For example, a consumer may request an update to the PAN associated with a token.

The reporting and administration module 316 may allow the token requestors to request transaction details made using tokens by providing a token requestor identifier, a token or PAN alias and a transaction date range (e.g., a start and end date). In one embodiment, the network token system 202 may retrieve all the token transactions from the payment processing network 160 and maintain in a date store to provide the transaction details to the requesting registered entity to handle returns, chargebacks and disputes and to support analytics. The reporting and administration module 316 may provide the transaction details made using the given tokens (or tokens associated to the given PAN alias) between the given date range.

FIG. 4 shows an example of an entry 400 in a token registry database, in one embodiment of the invention. For example, the entry 400 may be in token registry database A 211 or token registry database B 221.

As illustrated in entry 400, the exemplary entries in the token registry database may include a token 402, a primary account number 404, a token requestor identifier 406, a token presentment mode 408, a token type 410, a token expiration date 412, merchant restrictions 414, a token assurance level 416, a token timestamp 418, a token status 420, and consumer account details 422.

The token 402 may be a sixteen digit numerical value. In one embodiment, the token 402 conforms to the account number rules in an ISO message. The token 402 corresponds to the sixteen digit payment account number 404. The token BIN "490000" is mapped to the issuer BIN "414709." The token requestor identifier 406 is a ten digit numerical value that corresponds to an entity that is registered with the network token system 202. For example, the token requestor identifier 406 may correspond to an e-commerce merchant associated with the merchant computer 140. The token presentment mode 408 shows that the token may be presented in the form of a QR™ code as part of the transaction. The token type 410 is shown as dynamic which may indicate that the token 402 may be for one time use only or may expire on Jul. 31, 2014 at 2:35 pm as indicated by the token expiration date 412. Merchant restrictions 414 indicate that the token 402 may be restricted to merchants with merchant category code 5111. The token assurance level 416 indicates "issuer authenticated," meaning, for example, that the issuer computer 180 interacted with the consumer 110 through a standard protocol (ACS) and authenticated the original credential and the consumer 110. The token timestamp 418 indicates that token was issued on Jul. 30, 2014 at 2:35 pm. The token status 420 indicates that the status of the token 402 is active. The consumer name and address 422 indicates the name and address of the consumer 110 initiating the transaction. Note that the entries shown in FIG. 4 are for illustrative purposes only and token registry databases 211 and 221 may include more or less entries. For example, the token registry databases 211 and 221 may also include a PAN expiration date, MSISDN, PAN alias, UUID, IMEI, IMSI, MAID, authorization code of consumer verification done, etc.

Figure 5:
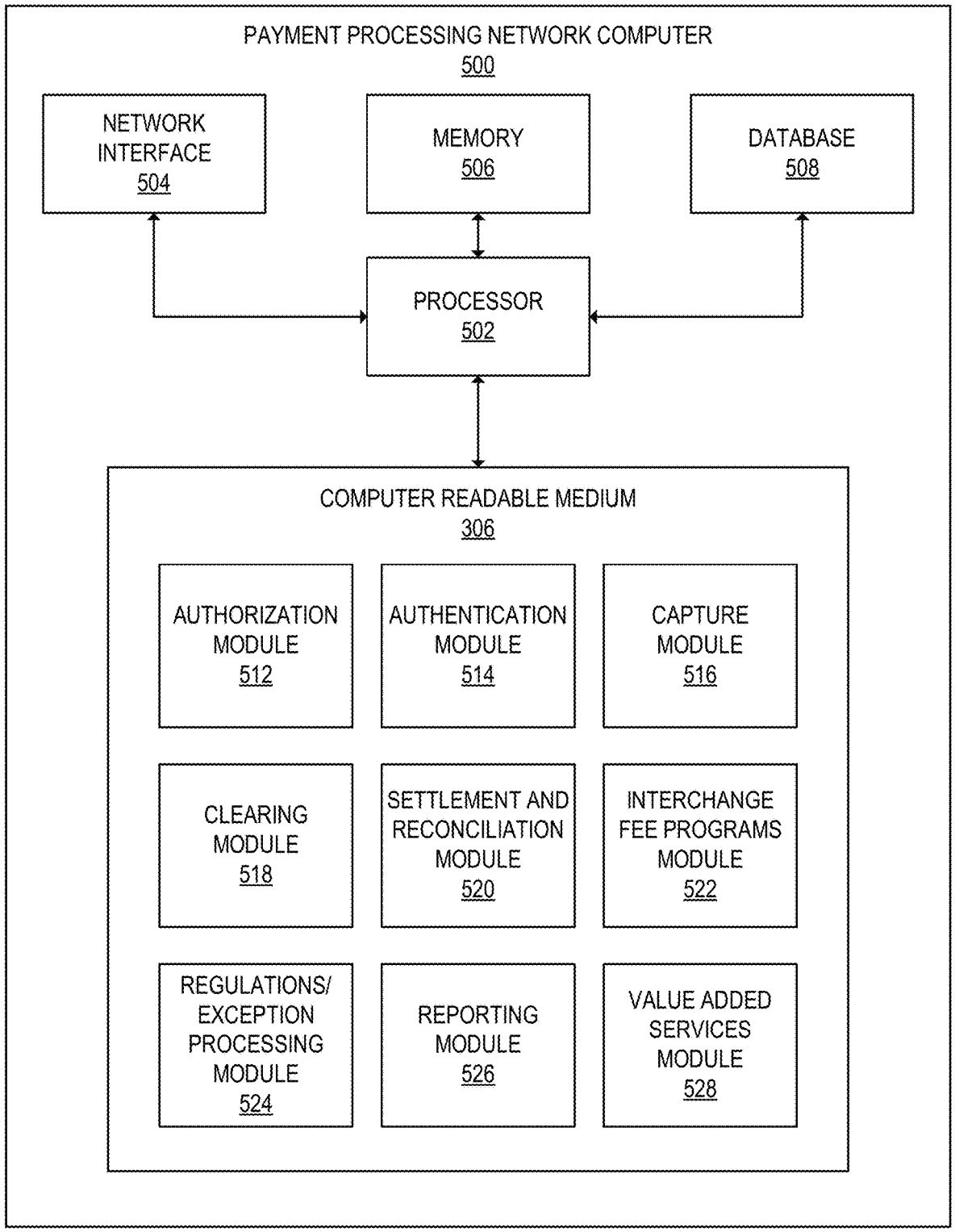
FIG. 5 shows a block diagram of a processing network computer according to one embodiment of the invention.

FIG. 5 illustrates components of the payment processing network computer 500 in one embodiment of the invention. In some embodiments, payment processing network A 160 and payment processing network B 170 may be implemented using or in a similar manner to payment processing network computer 500.

The payment processing network 500 may include a processor 502 communicatively coupled to a network interface 504, a memory 506, a database 508, and a computer readable medium 510.

The network interface 504 may be configured to allow the payment processing network 500 to communicate with other entities such as the acquirer computer 150, a different payment processing network (e.g., payment processing network A 160 and/or payment processing network 170), issuer computer 180, etc. using one or more communications networks.

The memory 506 may be used to store data. The memory 506 may be coupled to the processor 502 internally or externally (e.g., cloud based data storage) and may comprise any combination of volatile and/or non-volatile memory, for example, RAM, DRAM, ROM, flash, or any other suitable memory device.

The database 508 may store data associated with a plurality of consumers such as consumer personal and payment account information.

The computer readable medium 510 may be in the form of a memory (e.g., flash, ROM, etc.) and may comprise code, executable by the processor 502 for implementing methods described herein. The computer readable medium 510 may include an authorization module 512, an authentication module 514, a capture module 516, a clearing module 518, a settlement and reconciliation module 520, an interchange fee programs module 522, a regulations and exception processing module 526, a reporting module 526 and a value added services module 528.

The authorization module 512 may comprise code, executable by the processor 502 to validate token data elements, to provide a token assurance level, to provide support for lost and stolen devices and for token exchange.

The authorization module 512 may also comprise code, executable by the processor 502, to process an authorization request message comprising a token. In one embodiment, the authorization module 512, in conjunction with the processor 502, may validate the token requestor identifier to determine if the transaction can be approved or declined. For example, the token requestor identifier may be associated with a wallet application that may be used by the consumer 110 to initiate a transaction using the consumer device 120. The token requestor identifier may be provided by the network token system 102 to the wallet application during the onboarding process. In some embodiments, the authorization module 512 may approve or decline the transaction using various data associated with the transaction such as a token presentment mode, token number, token timestamp, token expiration date, token assurance level, a determination that the account used to conduct the transaction is lost, stolen, or compromised, or any other suitable data. The aforementioned data may be determined from the contents of the authorization request message for a transaction, a token registry database, or any other suitable source.

In one embodiment, the authorization module 512, working in conjunction with the processor 502, may provide support for token exchange. For example, the authorization module 512 may modify the authorization request message to replace the token with a PAN and send the modified authorization request message to the issuer 170. The authorization module 512 may also restore the token in the authorization response message received from the issuer 170 before forwarding it to the acquirer computer 150. In some embodiments, records of the authorization may be contained in an authorization log database that can be transmitted to the participating acquirers. The data contained in the authorization log database can be in a plurality of file formats.

In some embodiments, authorization module 512 may be configured to process payment transactions that use a token associated with a different payment network. For example, in some embodiments, authorization module 512 may be configured to generate and send a token verification request to a payment network associated with the token, or specifically to a network token system associated with a payment network. Authentication module 512 may be further configured to receive a token verification response including the original PAN associated with the token and a validation result. The issuer 170 associated with the original PAN may be determined, and an authorization request message for the transaction including the original PAN and the validation result may be sent to the issuer computer 180.

The authentication module 514 may comprise code that can be executed to the processor 502 to apply one or more authentication methods (as discussed previously) to authenticate token transactions based on the presentment modes. In one embodiment, the authentication module 514 may comprise code for authenticating the QR™ code token transactions using existing authentication schemes (e.g., entering personal information into a keypad). In another example, the authentication module 514 may comprise code for authenticating contactless EMV token transactions based on dCVVs that are formed with our without ATCs (Application Transaction Counters) or cryptograms.

The capture module 516 may comprise code for processing a capture file. For example, the merchant computer 140 may send the token requestor identifier in the capture file that is sent to the acquirer computer 150. The payment processing network computer 500 can convert the token into a PAN and provide the PAN to the acquirer computer 150 in the capture file to prepare clearing drafts pursuant to existing processing rules.

The clearing module 518 may be configured to process clearing transactions with tokens. A clearing process may be performed to reconcile orders among the transacting entities such as the issuer computer 180 and the acquirer computer 150/merchant computer 140. When a token is used in a clearing draft message, a token requestor identifier may be present in the appropriate data field. In one embodiment, for Base II processing, the clearing module 518 can substitute clearing draft messages received with a token with the PAN for related clearing processing. In some embodiments, if the authorization was conducted with a token, the token is replaced with a PAN in the authorization data files provided to the acquirer computer 150. The token number and expiration date can be processed pursuant to existing rules and can be provided in the clearing draft message (e.g., in the expiration date field).

In some embodiments, the clearing draft message may include a token assurance level. In one embodiment, at the time of transaction processing, if the token requestor identifier is present, the token can be validated against the token requestor identifier to which the token was originally issued. If the validation fails, the payment processing network computer 160 may return an appropriate code in the clearing draft message. In some embodiments, based on the issuer option of receiving the token requestor identifier, the payment processing network computer 160 may forward the token requestor identifier in the clearing draft message to the issuer computer 180. In some embodiments, the acquirer computer 150 may retain and return the token requestor identifier value used in the original transaction in all the subsequent transactions. In one embodiment, the POS condition code and the POS entry mode code fields can reflect the applicable token presentment mode in the clearing draft message.

The settlement and reconciliation module 520 may be configured to process settlement and reconciliation transactions with tokens. The settlement and reconciliation module 520 may provide support for the token requestor identifier and its validation in the reports and raw data files associated with the settlement and reconciliation processing of the transactions. In one embodiment, the settlement and reconciliation module 520 may include the tokens and the token requestor identifier in the reports and raw data files destined to the acquirer computer 150. In one embodiment, the settlement and reconciliation module 520 may include the real PAN and optionally the token requestor identifier in the reports and raw data files destined to the issuer computer 180. In some embodiments, the interface for processing transaction files (e.g., edit package) may be enhanced to process tokens in place of the PANs.

The interchange fee programs module 522 may comprise code for determining interchange rates and fees for token based transactions. Payment transactions conducted with tokens can qualify for existing fee programs and interchange rates applicable to the respective presentment modes and available card products.

The regulations/exception processing module 524 may be configured to apply operating regulations and perform liability and dispute processing for token payment transactions. Payment transactions with tokens can qualify for existing liability rules applicable to the respective presentment modes and available card products. For example, acquires and issuers can qualify for existing chargeback rules based on the presentment modes. The regulations/exception processing module 524 can map the tokens used in the original transactions to facilitate dispute processing related to chargebacks.

The reporting module 526 may be configured to provide reporting for token payment transactions. In some embodiments, the reporting module 526 may provide reports for each country and regions based on token attributes such as the token number and token ranges, token requestor identifier, consumer token assurance level, token expiration date, COF (card on file) indicator and the token presentment mode.

The value added services module 528 may comprise code for supporting value added services to support token transactions. For example, account update functions of merchant enquiry and setup of payment controls can be supported for tokens.

Figure 6:
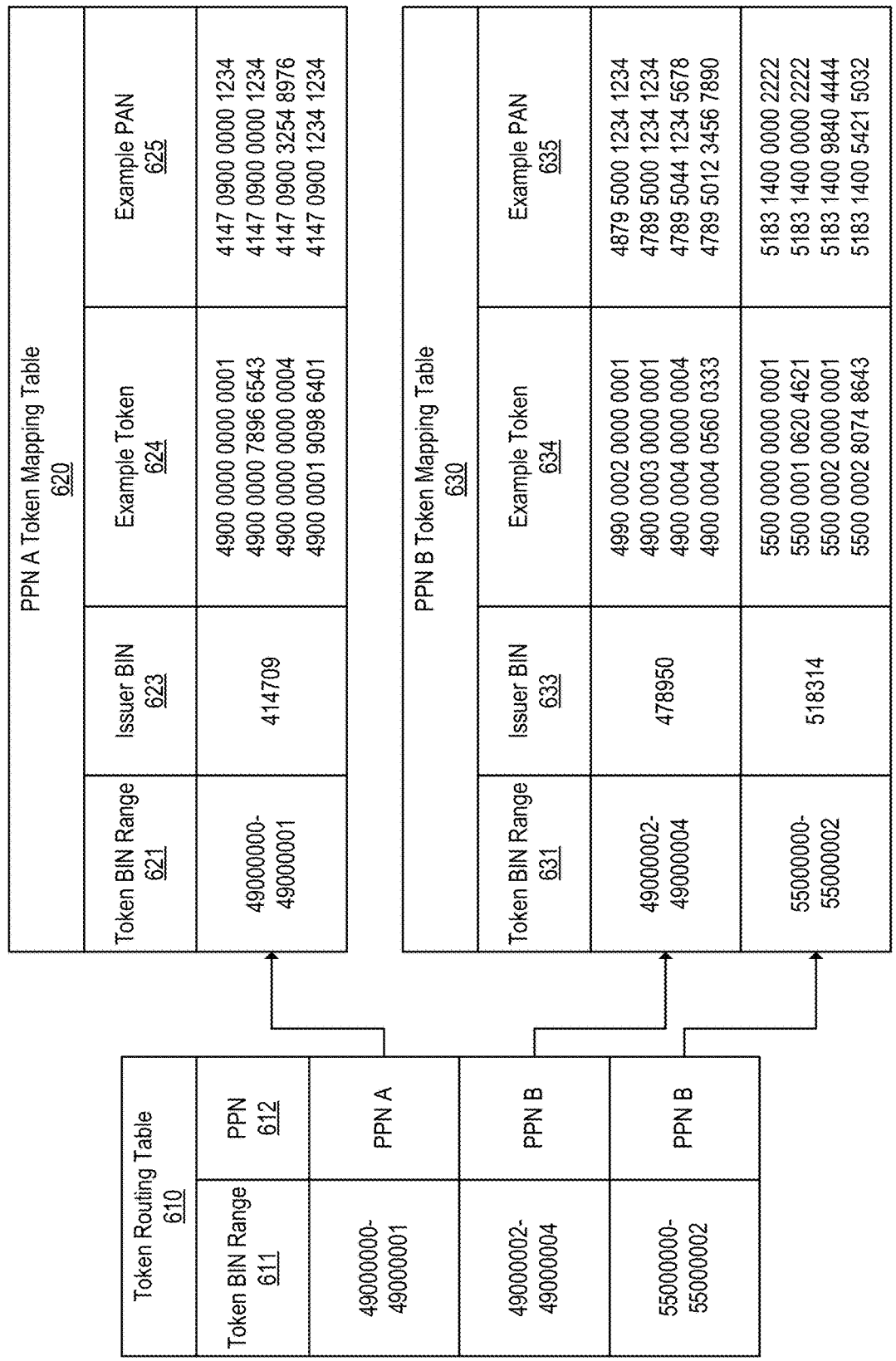
FIG. 6 shows an example of a token routing table and examples of token mapping tables according to one embodiment of the invention.

FIG. 6 shows an example of a token routing table 610 and examples of token mapping tables 620 and 630 according to one embodiment of the invention.

Token routing table 610 includes a plurality of token BIN ranges 611, and a payment processing network 612 corresponding to each BIN range. A "token BIN range" may indicate any set or range of token BINs associated with the same issuer and/or the same issuer identifier (e.g., the same BIN in the original PAN). For example, as shown in the first row of token routing table 610, the token BIN range "49000000"-"49000001" may be associated with payment processing network A 160. Likewise, as shown in the second and third rows of token routing table 610, the token BIN ranges "49000002"-"49000004" and "55000000"-"55000002" may be associated with payment processing network B 170.

In some embodiments, token routing table 610 may be used to determine a payment network associated with a token. For example, in one embodiment, a token may contain an 8-digit token BIN followed by an 8-digit token identifier. In such an embodiment, if a token "4900 0000 1234 5678" were received, the token BIN of "4900 0000" may be identified. The token BIN may then be compared with token routing table 610 to determine that the token is associated with payment processing network A 160. In another example, a token "5500 0001 2345 6789" may be compared with token routing table 610 to determine that the token is associated with payment processing network B 170.

In some embodiments, each payment processing network in a payment system 100 may maintain a copy of token routing table 610. Accordingly, each payment network may be able to determine the payment network associated with any received token. Payment processing network A token mapping table 620 and payment processing network B token mapping table 630, on the other hand, may only be stored by payment processing network A 160 and payment processing network B 170, respectively.

Payment processing network A token mapping table 620 includes information mapping a token associated with payment processing network A 160 back to an original PAN associated with that token. PPN A token mapping table 620 may, for example, comprise data maintained in token registry database A 211 of network token system A 210. In the embodiment shown in FIG. 6, PPN A token mapping table 620 comprises a token BIN range field 621, an issuer BIN field 623 corresponding to the token BIN range 621, examples of tokens 624 that correspond to the token BIN range 621, and examples of original PANs 625 that correspond to the generated tokens.

Issuer BIN 623 may include one or more issuer bank identification numbers (BINs) associated with a token BIN range 621. In some embodiments, there may be a one-to-one correlation between a token BIN and an issuer BIN. In other embodiments, such as the one shown in FIG. 6, there may be multiple token BINs that correspond to an issuer BIN. For example, as shown in the first row of PPN A token mapping table 620, both token BINs "49000000" and "49000001" may correspond to issuer BIN "414709."

Example token field 624 shows examples of tokens that may correspond to the token BIN range 621. For example, as shown in the first row of PPN A mapping table 620, tokens "4900 0000 0000 0001" and "4900 0001 9098 6401" may both fall in to the BIN range "49000000" to "49000001."

Example PAN field 625 shows examples of PANs that may correspond to the token BIN range 621 and issuer BIN 623. For example, PAN "4147 0900 0000 1234" may correspond to token "4900 0000 0000 0001," and PAN "4147 0900 1234 1234" may correspond to token "4900 0001 0908 6401."

Accordingly, PPN A token mapping table 620 may be used to determine the original BIN and PAN corresponding to a token associated with payment processing network A 160. PPN B token mapping table 630, comprising token BIN range 631, issuer BIN 633, example tokens 634, and example PANs 635, may similarly be used to determine the original BIN and PAN corresponding to a token associated with payment processing network B 170.

Using a token routing table 610 and token mapping tables 620 and 630 in this manner may provide several advantages. For example, a PAN's actual BIN is obfuscated while conducting a transaction, so that the corresponding token is less sensitive than a corresponding account identifier (e.g., PAN including a BIN). In addition, since each payment network only stores PANs corresponding to tokens associated with that payment network, no single payment network is required to maintain token to PAN mappings for every token. Furthermore, because the token issuer identifier (e.g., token BIN) is static, the token issuer identifier can be used to define a certain range of tokens. That range may correspond to a particular issuer, as well as a particular account or product segment (e.g., a platinum account, signature account, etc.) within a particular issuer. Further, the static nature of the tokenized BIN allows the network token system to more effectively manage the assignment, distribution, and routing of tokens in the payment system 100 because the same routing table 610 including token issuer identifiers may be delivered to existing transaction processing entities within the payment system and may be implemented without extensive infrastructure investment and reconfiguration. For example, the payment network associated with a token may be easily determined without requiring sensitive data relating to the token (e.g., the real PAN) to be stored by other payment networks.

II. Network Token Processing Methods

FIG. 7 shows a table 700 illustrating exemplary fields of an authorization request message with PAN based values initiated using a portable consumer device (e.g., a credit card) and token based values (initiated using a mobile device with the token provisioned thereon), according to one embodiment of the invention.

The table 700 illustrates fields 702 of an authorization request message. The authorization request message may be generated by the merchant computer 140 in response to a transaction initiation request by a consumer 110. The fields 702 of the authorization request message may include a primary account number (PAN) field 702A, an expiration date field 702B, a token presentment mode field 702C, a token requestor identifier field 702D, a merchant data field 702E, a dynamic card verification (dCVV) field 702F, an application cryptogram field 702G, an issuer discretionary data field 702H and an assurance level code field 702I. As shown in the table 700, the table 700 provides a comparison of an authorization request message initiated using a portable device with a PAN based value (e.g., a traditional credit card, debit card, etc.) and an authorization request message generated using a mobile device with a token provisioned thereon and provided by a mobile payment application or other application on the mobile device. As such, the table 700 provides a comparison of the transaction fields 702 included in a traditional transaction initiated using a PAN based value 704 from a credit card (or other portable device) and a transaction initiated using a token based value 706 from a mobile device.

As can be seen in the table 700, embodiments provide additional data elements to be passed during transaction processing that are not available to traditional payment processing systems using credit, debit, smart cards, or any other traditional account identifier systems. For example, the token based transaction may include a format preserving token value 706A, a token presentment mode 706C, a token requestor identifier 706D, a dynamic card verification value (dCVV) 706F, as well as a token assurance level code 706I. These values may not be present or available during traditional PAN based card transactions.

For example, the primary account number field 702A can include a token based value 706A "4900 0000 0000 0001" in place of the corresponding PAN "4147 0900 0000 1234." The use of a token value allows the system more flexibility and security than traditional PAN based values. For instance, if the authorization request message is intercepted at the time of transaction initiation or by an infected device in the payment system, sensitive payment information (e.g., PAN, expiration date, CVV, etc.) may not be intercepted. Instead, a token may be used that may be more easily updated, managed, and controlled by the payment processing system. For example, the token may be device specific such that if a transaction is initiated by a different device, the transaction may be determined to be fraudulent.

Further, the payment processing network may easily update token based relationships in the token vault and may more easily control the status of a token than previous PAN based transaction accounts. For instance, the network token system may receive status and maintenance updates from an issuer, token requestor, merchant, or any other relevant party regarding a lost or stolen device and may change the status of a token to inactive, hold, deactivate, or any other relevant status to control the use of the token in transactions. Accordingly, the token values provide additional control by a payment processor or other token management party to control the use and processing of transactions.

Additionally, token based transactions may include a token presentment mode that may be included in any transaction based on how the token is provided to a merchant, merchant server computer, acquirer, or any other payment service provider for processing of a transaction. The token presentment mode field 702C may not be applicable for the PAN based value. However, for token based transactions, the token presentment mode field 702C may include a presentment mode 706C for the token such as a QR™ code, NFC, e-commerce or online, etc.

The token presentment mode may be provided by the merchant computer or other device that receives a token from a consumer device or otherwise (e.g., card-on-file merchants may receive token from the network token system) and generates the authorization request message. The token presentment mode may be indicated through any suitable manner. For example, as shown in FIG. 7, the token presentment mode may include a name of a token reception type (e.g., QR Code, COF, e-commerce, NFC, etc.). In other embodiments, the token presentment mode may include an alphanumeric indicator that is associated with each possible type of token presentment (e.g., 1=NFC, 2=e-commerce, etc.).

The token presentment mode allows the network token vault an additional level of control over token based transactions that may not be available to traditional PAN based transactions. For example, token based transactions may be channel limited meaning that each token may be limited to a particular type of transaction (e.g., NFC, e-commerce, QR Code, etc.). As such, if the network token system receives an authorization request message comprising a token presentment mode of an NFC transaction (meaning that the authorization request message was generated in response to a transaction being initiated from a mobile device using a merchant NFC access device which received the token) but the token requestor or the network token system limited the token to transactions initiated using QR codes, the network token system and/or payment processing network may determine that the token has been intercepted or otherwise stolen and that the transaction is fraudulent. As such, the token presentment mode allows a payment processing network, issuer, and/or network token system additional control over financial transactions and additional security tools to minimize fraudulent transactions.

The token requestor identifier field 702D may include an identifier 706D for the registered entity that initiated the tokenization request such as a wallet provider, a payment enabler, etc. The token requestor identifier may be provided by any entity associated with the authorization request message. For example, in some embodiments, a payment enabler (e.g., a digital wallet provider) can orchestrate the population of the token requestor identifier 706D into the authorization request message before passing it to the merchant computer 140 when acting as a payment enabler. In one embodiment, the acquirer computer 150 associated with an acquirer or an acquirer processor can populate the token requestor identifier 706D for each merchant into the authorization request message field (e.g., 702D) prior to the submitting the authorization request message to the payment processing network A 160. In such embodiments, the network token system may deliver a list of registered token requestor identifiers to acquirer computers on a periodic basis to ensure the acquirers have accurate token requestor identifiers for each merchant or other payment initiator.

The token requestor identifier may allow the network token system to ensure that a token is being provided by the entity that initially asked for the token. As such, by including the token requestor identifier, the network token system, the payment processing network, and/or the issuer may limit fraudulent transactions initiated using sniffed or otherwise intercepted account credentials. For example, if a malicious third party intercepts a token value and attempts to use the token value in a transaction initiated by a mobile device the populated token requestor identifier associated with the mobile device or mobile wallet of the malicious third party would not match the token requestor identifier stored in the token vault for the token. As such, any transaction associated with the authorization request message may be denied as being fraudulent. Further, the token record may be inactivated and/or otherwise indicated as being compromised. The network token system may further inform the consumer, an issuer, and any other interested parties associated with the compromised token record.

The dynamic card verification field 702F may not be applicable for the PAN based transaction authorization request message 704 but may have a relevant token based value 706F (e.g., 123). The dynamic card verification field may be provided by a mobile payment application or other application that initiates a transaction with a merchant or other third party and may be provided by applying transaction information to a shared secret or other shared algorithm. The transaction information may be shared between the payment processing network and the consumer device so that the payment processing network may validate the dynamic card verification value using the shared algorithm and the shared transaction information. For example, a mobile payment application of a mobile device may use a shared algorithm that uses a time, a transaction counter, and/or other dynamic data as well as a portion of the token to generate a dynamic card verification value (dCVV) for each transaction and may pass the dCVV in the authorization request message. The payment processing network may then use the shared algorithm and the transaction information (e.g., token, time, transaction counter, etc.) to generate a dynamic card verification value and compare the generated dCVV value to the received dCVV value. If the values match, the dCVV is verified and the payment processing network (or issuer) may know that the mobile payment application and/or token information is authentic.

The application cryptogram field 702G may include a dynamic cryptogram that is generated using an algorithm and may be different for each transaction. The application cryptogram field 702G may be card generated for a CHIP transaction for the PAN based value 704 and the token based transaction 706G. Additionally, the application cryptogram may be dependent on the transaction initiation method and type of application used to initiate the transaction. For example, the application cryptogram field 702G may have different values for 706G for different presentment modes such as QR™ code, NFC, etc. As such, in some embodiments, the application cryptogram may be used to ensure a token is being used in the designated transaction channel. For example, a token that is limited to NFC transactions only, may be associated with a NFC transaction application cryptogram algorithm and if the received application cryptogram is not validated with the NFC transaction application, the transaction may be declined. Accordingly, the application cryptogram allows for further transaction validation and control and provides the security benefits described above in reference to the token presentment mode.

The issuer discretionary data field 702H may include data 706H that may be provided by an issuer computer 180 (e.g., loyalty data), the network token system, or by the payment processing network 160. This field may provide entities within the transaction processing system flexibility in passing information to various entities within the transaction processing system.

The assurance level code field 702 may include assurance level information 706 such as information about which entity performed the authentication of the consumer or payment device (e.g., issuer authenticated). The assurance level code field 702 may indicate a level of assurance for the token 706A in the transaction. The token assurance level code can indicate how the cardholder, card credential, and/or the token have been authenticated by the payment network. For example, the token assurance level code can indicate which of the above authentication methods were used to authenticate the cardholder when the token was requested and ultimately generated. These authentication methods include, but are not limited to, a card verification value (CVV2) check, an address verification system (AVS) check, a zero dollar authorization, a payment processing network on-behalf-of authentication, a 3D-Secure extension issuer access control server (ACS) validation, and a 3D-Secure extension issuer one time password (OTP) validation. During the course of a normal payment transaction, the token assurance level code can be used by the issuer 180 for additional risk assessment and to obtain a certain level of confidence that the user using the token is in fact the genuine cardholder.

Some of the fields of the authorization request message may have the same PAN based value 704 and the token based value 706. For example, expiration date, merchant data, and issuer discretionary data may include the same information whether a token based transaction or a PAN based transaction.

Figure 8:
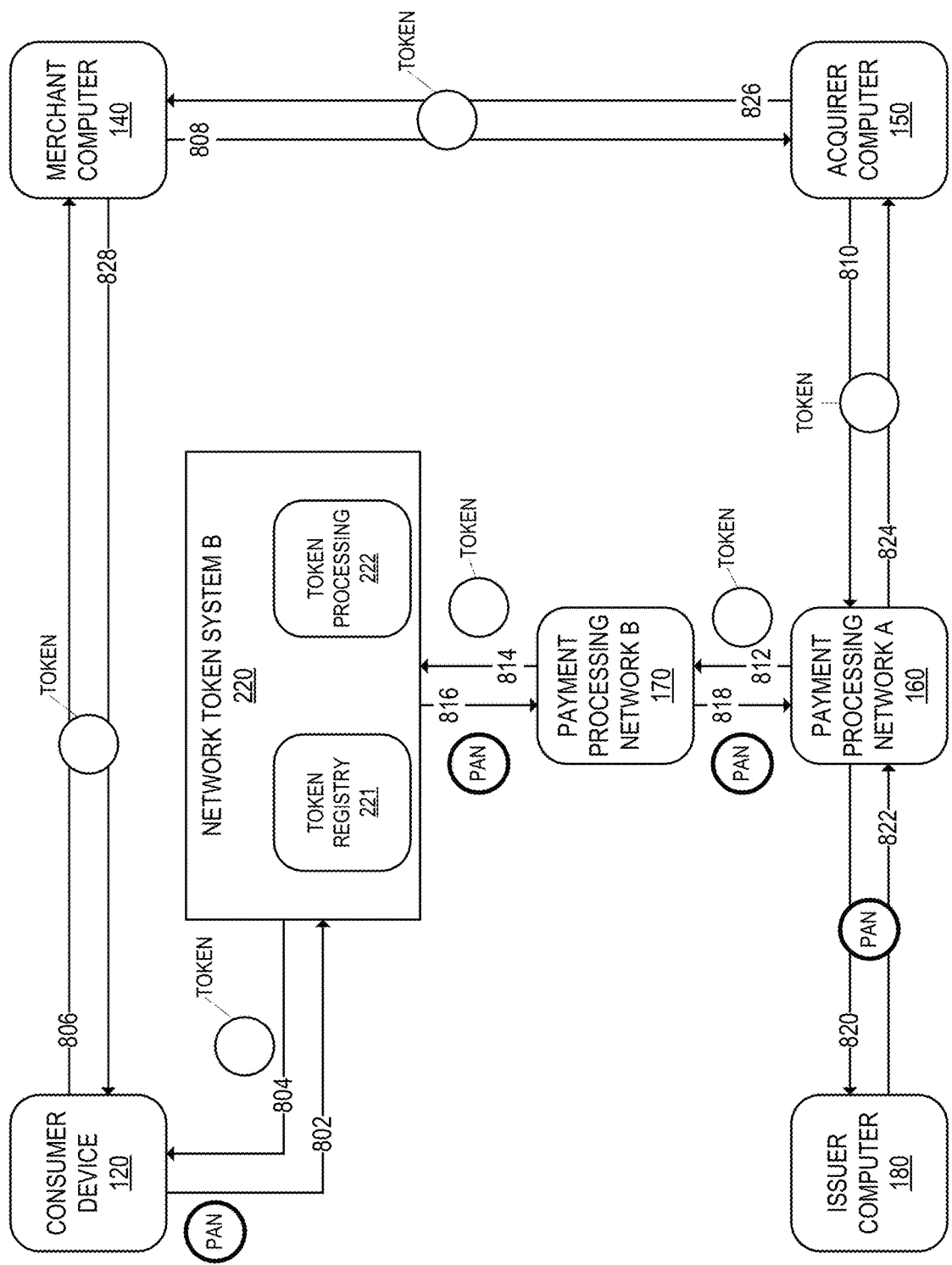
FIG. 8 shows a transaction flow using a payment token according to one embodiment of the invention.

FIG. 8 shows a transaction flow using a payment token according to one embodiment of the invention. In the embodiment shown in FIG. 8, a token requestor requests a token for an account identifier and provisions the token into the consumer device 120 which the consumer then uses to initiate a transaction using the token. However, it is worth noting that other token processing methods may be possible using embodiments of the invention. For example, a token requestor may include a merchant computer and a token may be provided to a merchant and stored as a card-on-file token such that the merchant may perform transactions without providing the token to a consumer device as shown in FIG. 8. Further, an issuer may request a token and provide the token to the consumer device. As such, there are a variety of different methods and processes for obtaining a token and initiating a transaction using a token that are not shown in FIG. 8, as one of ordinary skill in the art would recognize. Embodiments of the invention may be used with any other these methods of obtaining and provisioning tokens as well as initiating transactions using the tokens.

At step 802, the consumer 110 provides an account identifier (e.g., primary account number (PAN)) to a network token system B 220 associated with payment processing network B 170 to request a token for a transaction. For example, the consumer 110 can access a mobile application or a website on the consumer device 120 to interact with a mobile wallet provider (also referred to as a digital wallet provider), a mobile network operator, a device manufacturer, or any other entity that is requesting and providing tokens on behalf of consumers, or may directly interface with network token system B 220 or payment processing network B 170. In some embodiments, the consumer 110 participates in a consumer authentication and verification process with the token requestor, network token system B 220, or issuer computer 180 using one or more authentication schemes to utilize the network token services. In one embodiment, the token may be requested using a token request message that may include a token requestor identifier, an account identifier (e.g., PAN), an expiration date, a card verification value (e.g., CVV2) associated with the account identifier, and any other relevant information to the network token system 220 in order to request a token.

At step 804, the network token system B 220 generates and/or determines a token associated with the token request and provides the token to the token requestor in response to the token request. For example, referring back to FIG. 3, the network token system 202 may provide a token value (e.g., token number), a token expiration date, and a token assurance level to the consumer device 120. In some embodiments, the network token system B 220 may generate the token value based on the real issuer identifier (e.g., BIN) of the account identifier (e.g., PAN) provided in the token request. Accordingly, the token may be generated using a token BIN range associated with the real account issuer associated with the account in which a token is being requested. For example, referring back to FIG. 6, the token processing computer may determine that the token should be generated using a token BIN range of "49000000-49000001" for the PAN 802 of "4147090000001234" with the real issuer identifier (e.g., BIN) of "414709."

The token value may be generated using any suitable method once a token BIN is designated, including choosing the next available sequential available token, randomly generating available tokens within the token BIN range, or any other suitable method. Once the token is generated or determined, a token record/entry for the token may be generated including the token data shown in FIG. 4 described above regarding token entry or records in the token registry database 221. Any processes or methods may be performed to obtain the relevant data to populate the token record data including obtaining data from a payment processing network B 170 or issuer 180 associated with the account identifier, authenticating a consumer to determine the token assurance data associated with the request, and any other relevant processes for obtaining any relevant information. For instance, in some embodiments, application cryptogram shared secrets (e.g., cryptographic algorithms, derived encryption keys, etc.) may be requested from payment processing network B 170 so that the token registry database B 221 may validate the application cryptograms and dynamic card verification values received during transaction processing. Alternatively, this validation may occur at the payment processing network B 170 and thus, may not necessarily be stored at the token registry database B 221.

At step 804, network token system B 220 may provide the token to the consumer 110 and/or the consumer device 120. In one embodiment, the token may be stored in a secure location on the consumer device 120, e.g., a secure element of the mobile device.

In some embodiments, network token system B 220 may also pass a token requestor identifier and a token assurance level code associated with the token to the consumer device 120 and may provision the token requestor identifier and token assurance level code with the token in the consumer device. Accordingly, when the consumer uses the consumer device to initiate a transaction, the token requestor identifier and token assurance level code may be passed in a generated authorization request message.

At step 806, the consumer 110 may provide the token 804 to the merchant computer 140. In one embodiment, the token 804 may be presented as part of the transaction using any suitable token presentment mode. For example, the token requestor 204 may provide the token 804 in the form of a QR™ code that may be displayed on the consumer device 120. A merchant can scan the QR™ code including the payment token into the merchant computer 140. Alternatively, the consumer 110 can wave the consumer device 120 in the vicinity of a contactless reader coupled to the merchant computer 140 to transfer the payment token in the contactless mode. Alternatively, a consumer may tap or otherwise make contact with a merchant access device to pass the token and other transaction information to initiate a transaction.

Typically, at the time the merchant initiates a transaction, the merchant may determine a payment processing network to use for a transaction. The determination of which payment processing network to use may depend on many factors, such as the availability of equipment to process transactions using a payment network, transaction fees associated with each payment network, merchant preference, etc. In the flow shown in FIG. 8, a payment processing network A 160 is determined to be the payment network used to process the transaction.

At step 808, the merchant computer may generate an authorization request message including the token 804 and send the authorization request message to the acquirer computer 150 for the transaction initiated by the consumer 110. An "authorization request message" may include an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include the token received by consumer device 120 at step 804. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the device (e.g., an access device such as a merchant computer 140) that generated the authorization request message, information about the location of the device, etc.

In some embodiments, referring back to FIG. 7, the authorization request message may include token based values such as a token value, a presentment mode, a token requestor identifier, and/or an assurance level code as described above. Depending on the type of transaction, the various token based information in the authorization request message may be provided through any number of different entities and through a various number of processes. For example, using the examples provided above, if a token is provided through a QR Code displayed by a consumer device, the merchant computer may determine that the token was received through a QR Code and may populate the authorization request message with the token presentment mode associated with the QR Code. Alternatively, the token presentment mode may be identified and provided by the mobile application on the mobile device, the token requestor, and/or any other suitable entity. Further, the QR Code may comprise additional token related information for populating the authorization request message including a token assurance level code, token requestor identifier, application cryptogram, issuer discretionary data, and any other relevant information described in reference to FIG. 7 above.

At step 810, the acquirer computer 150 may forward the authorization request message including the token 804 to the payment processing network A 160. In one embodiment, the acquirer computer 150 can populate the token requestor identifier for each merchant into the authorization request message field (e.g., 702D in FIG. 7) prior to the submitting the authorization request message to the payment processing network A 160. In such embodiments, the acquirer computer 150 may receive a mapping or indication of the relevant token requestor identifiers associated with a merchant before the transaction is initiated.

At step 812, the payment processing network A 160 may receive the authorization request message, may determine that the authorization request message comprises a token, and may further determine that the token is associated with a different payment processing network (i.e., payment processing network B 170). Accordingly, payment processing network A may request the PAN corresponding to the token from payment processing network B 170. For example, in some embodiments, payment processing network A 160 may send a token verification request message comprising the token and transaction data to payment processing network B 170. In some embodiments, the payment processing network A 160 and payment processing network B 170 may communicate using network interface 201 as shown in FIG. 2.

In some embodiments, the token verification request message sent by payment processing A 160 to payment processing network B 170 may include the received authorization request message (e.g., so that payment processing network B 170 may validate the transaction attributes associated with the token received in the authorization request message). The transaction data may include any data associated with the transaction, such as a merchant category code (MCC) of merchant 140, an amount for the transaction, goods or services being purchased in the transaction, a geolocation of the transaction, etc.

At step 814, payment processing network B 170 receives the token verification message. Payment processing network B 170 may then send the token to the network token system B 220 to request the original PAN corresponding to the token. In some embodiments, payment processing network B 170 may provide to network token system B 220 various token and transaction attributes, so that network token system B 220 may determine whether the PAN is authorized to be provided in response token verification request.

At step 816, the token processing computer 222 of the network token system 220 may receive the token, search the token registry 221 for the token record associated with the received token, may determine an account identifier (e.g., PAN) associated with the token, determine any limitations and/or validation information associated with the token, and may provide the PAN (and any other relevant validation information) to payment processing network B 170.

In some embodiments, before providing the PAN to payment processing network B 170, the token exchange and routing module 316 of token processing computer B 222 may validate if the token/PAN mapping is valid and/or if the transaction is allowed for the token based on the requested timestamp, transaction timestamp, token expiration date, token presentment mode, token requestor identifier, and any other relevant information. If a PAN cannot be located or validated for a token request, then the transaction may be declined. In this embodiment, if the transaction information is validated with the limitations associated with the token in the token registry, the account identifier (e.g., PAN) may be returned to the payment processing network B 170 with an indicator that the request is authorized.

In some embodiments, the PAN and the limitations associated with the token may both be provided to payment processing network B 170. Subsequently, payment processing network B 170 may evaluate the received limitations and authorize the transaction if the transaction is in accordance with the received limitations.

Further, in some embodiments, the token processing computer 222 of the network token system 220 may be configured to perform all of the processes associated with the payment processing network B 170. As such, the processing steps described in steps 814-816 could also be performed by a single entity associated with both the network token system B 220 and the payment processing network B 170.

Once the token verification request message has been successfully authorized, payment processing network B 170 sends to payment processing network A 160 a token verification response message including the PAN corresponding to the token. In some embodiments, limitations associated with the token may also be included in the token verification response message.

At step 818, payment processing network A 160 receives the token verification response message including the PAN corresponding to the token. Payment processing network A 160 may modify the authorization request message to include the PAN in place of the token and provide the modified authorization request message to the issuer computer 180. The payment processing network A 160 may also perform any other validation, authentication, authorization, and/or any other relevant processes before modifying and sending the modified authorization request message. In some embodiments, the authorization request message to the issuer computer 180 may also include the token or an indication that the transaction involved a token, depending on the configuration settings of the issuer.

Additional data regarding the type of information included in the authorization request message, the modified authorization request message, any authorization response message, and the information available to each entity is provided in more detail regarding FIGS. 9-10 described below. For example, a token assurance level code may be provided in the modified authorization request message to provide the issuer additional information regarding the risk of the transaction and the confidence that the network token system has that the token requestor and/or consumer that requested the token was in fact the accountholder or an authorized agent of the accountholder.

At step 820, the issuer computer 180 receives the authorization request message, makes an authorization decision regarding whether the transaction should be approved or declined, and provides an authorization response message including an indication as to whether the transaction is approved or declined to the payment processing network computer A 160. The issuer computer may perform any number of processes to determine whether the transaction should be approved or declined. For example, the issuer computer 180 may determine if the transaction can be authorized based on the consumer account information (e.g., available balance, transaction history, etc.).

An "authorization response message" may include an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

At step 822, payment processing network A 160 may receive the authorization response message from the issuer computer 180 and modify the authorization response message received from the issuer computer 180 to replace the PAN information with the token information. In some embodiments, the payment processing network A 160 may interact with payment processing network B 170 (e.g., as discussed with respect to steps 812-818) to perform the PAN/token mapping to obtain the token associated with the PAN. However, in other embodiments, the payment processing network A 160 may temporarily store the PAN/token mapping for the transaction and may use the temporarily stored token to populate the token information in the authorization response message. Further, in some embodiments, the token may be provided in the modified authorization request message and thus, the token may be returned along with the account identifier (e.g., PAN) in the authorization request message and thus, may be parsed from the authorization response message. Payment processing network A 160 may log the decision of the issuer along with the token for the subsequent clearing and settlement processes. Accordingly, payment processing network A 160 may perform any number of processes to determine the token associated with the PAN.

At step 824, payment processing network A 160 may then modify the authorization response message to remove the account identifier (e.g., PAN) and send the modified authorization response message including the token to the acquirer computer 150. In some embodiments, the payment processing network A 160 may optionally provide the last four digits of the real account identifier (e.g., PAN) to the acquirer computer 150 in the modified authorization response message for printing on the receipt or otherwise confirming with the consumer that the correct account was charged or used for the transaction.

At step 826, acquirer computer 150 may forward the modified authorization response message to the merchant computer 140.

At step 828, merchant computer 140 may indicate the authorization response to the consumer 110. For example, the merchant computer 140 may send a message to the consumer device 140 indicating if the transaction is approved or declined.

Figure 9:
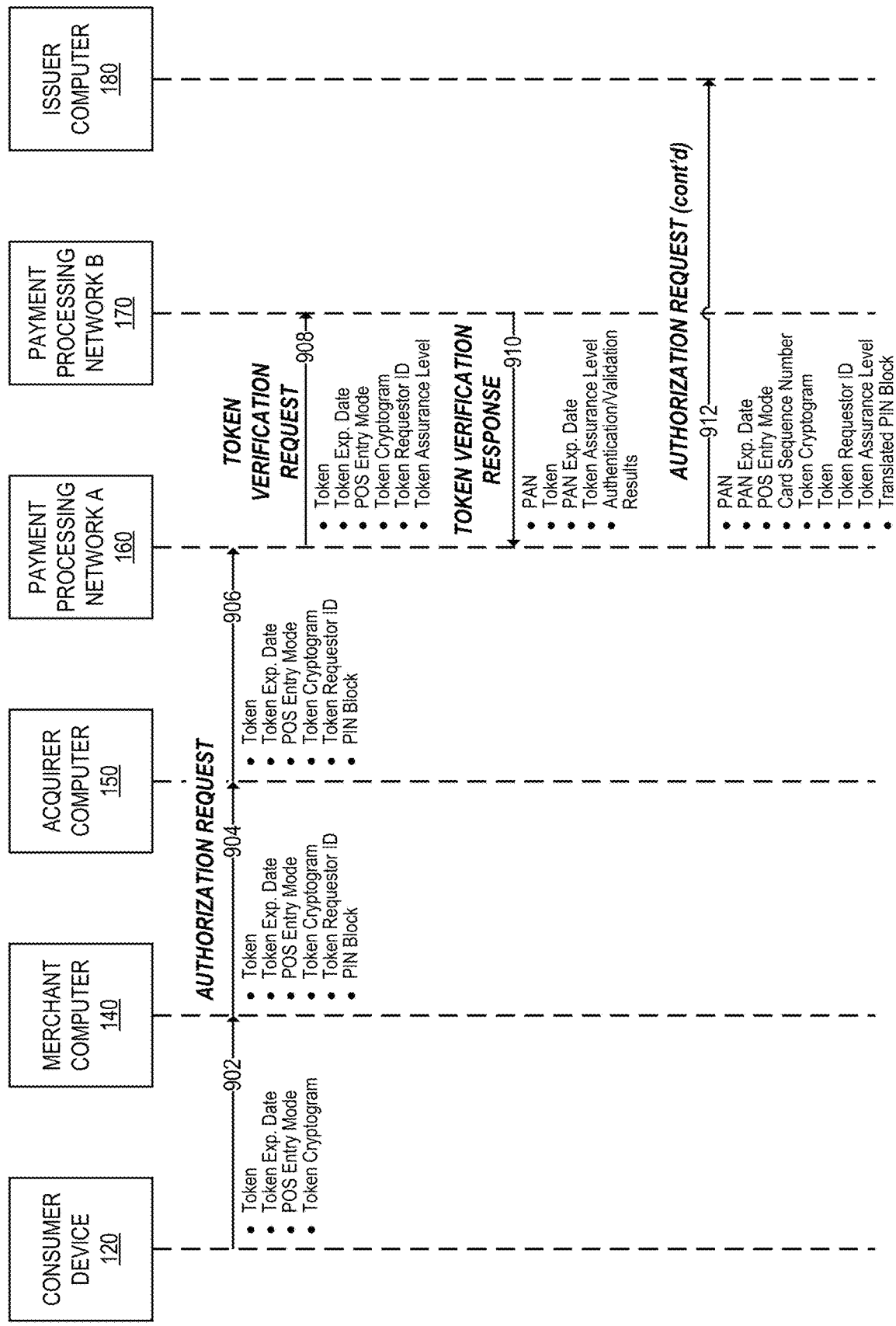
FIG. 9 shows a flow diagram for an authorization request for a transaction according to an embodiment of the invention.

FIG. 9 shows a flow diagram for an authorization request for a transaction according to an embodiment of the invention. Prior to the method of FIG. 9, a consumer 110 may obtain a token associated with payment processing network B 170.

At step 902, a consumer 110 may provide payment account information associated with a consumer device 120 to a merchant computer 140. For example, the payment account information may be transferred from a card or other device presented to an access device 130 at a merchant, or may be transferred electronically, such as in an online transaction. The payment information may comprise, for example, a payment token, a token expiration date, a point of sale (POS) entry mode, and/or a token cryptogram. The POS entry mode may indicate how the token was provided to merchant computer 140 (e.g., through a card swipe, an NFC transaction, manual user entry, etc.). The token cryptogram may include any encrypted or otherwise protected data associated with the consumer's payment account, such as a dynamic card verification value (e.g., a dCVV2).

At step 904, the merchant computer 140 may generate an authorization request message with the captured data (e.g., token, token expiration date, token presentment mode, token cryptogram, and token requestor identifier) and provide it to the acquirer computer 150. The authorization request message may include addition fields such as transaction data, merchant identifier, card sequence number, and any other relevant data. The token requestor identifier may be provided by the consumer device and/or wallet application or may be determined by the merchant computer based on the received information (e.g., based on the mobile payment application or mobile wallet used to initiate the transaction on the consumer device).

In some cases, such as in debit transactions, the authorization request message may also comprise a PIN block. A "PIN block" may include any encrypted data block comprising an encrypted PIN or other password entered by a user. In some embodiments, the PIN block may be encrypted using the token value or otherwise based on the token, so that the clear text of the PIN may only be read by an entity with knowledge of the token value.

At step 906, the authorization request message may be conveyed to the payment processing network computer A 160 by the acquirer computer 150.

At step 908, payment processing network A 160 generates a token verification request message. The token verification request message may include, for example, the token, the token requestor ID, the token expiration date, the POS entry mode, a token assurance level, and/or the token cryptogram. Any of these data fields may be determined from the authorization request message or any other suitable source.

Once payment processing network B 170 receives the token verification request, at step 910, payment processing network B 170 may interface with network token system B 220 to determine an account identifier (e.g., a PAN) associated with the received token, validate the transaction is compatible with the token information stored in the token record of the token registry 221 for the token (e.g., token presentment mode, merchant limitations, token requestor identifier validation, token cryptogram validation, etc.), and send the chip data (e.g., token cryptogram and chip transaction indicator), the token, the token expiration date, the token requestor identifier, a token assurance level, a PAN corresponding the token, and a PAN expiration date to payment processing network A 160 as part of a token verification response message. The token verification response message may also include authentication and/or validation results as determined by payment processing network B 170 and/or network token system B 220.

At step 912, payment processing network A 160 modifies the authorization request message for the transaction to include, for example, the PAN, the PAN expiration date, the POS entry mode, a card sequence number (which may be used to differentiate between different consumer devices 120 or tokens associated with the same PAN), the token cryptogram, the token, the token requestor ID, and the token assurance level. In some embodiments, any token-related data (e.g., the token, token requestor ID, token assurance level) may be omitted from the authorization request message. This may allow for tokenized transactions to be conducted even if an issuer 180 is not configured to support tokenization.

In addition, in some embodiments, if the authorization request message received by payment processing network A 160 includes a PIN block, the PIN block may translated to be based on the PAN rather than the token. This may be necessary or desirable for the issuer 180 to validate the PIN block. For instance, in some embodiments, the PIN block received at step 906 may be decrypted using the token and an issuer PIN validation key (PVK) associated with issuer 180 to determine the clear text PIN, and the PIN may be subsequently re-encrypted using a PIN encryption key (PEK) associated with issuer 180 and the PAN. Specifically, in one embodiment, the PVK and token may be used as inputs in a key derivation function to generate a decryption key for the PIN, and the PEK and PAN may be used as inputs into a key derivation function to generate an encryption key for the PIN. In some embodiments, the PEK and PVK may be the same key (i.e., an issuer PIN key). Accordingly, once the issuer computer 180 receives the translated PIN block, the PIN block can be validated using the PAN and the PVK (i.e., the issuer computer 180 does not need the token to validate the PIN). This enables tokens to be used in debit transactions and other PIN transactions wherein an issuer computer 180 is configured to validate a PIN provided in a transaction, even if the issuer is not aware of the tokenization of the transaction.

In some embodiments, if the authorization request message received by payment processing network A 160 includes a PIN block, the PIN block may be validated at payment processing network A 160 using the token and a PIN validation key (PVK).

Figure 10:
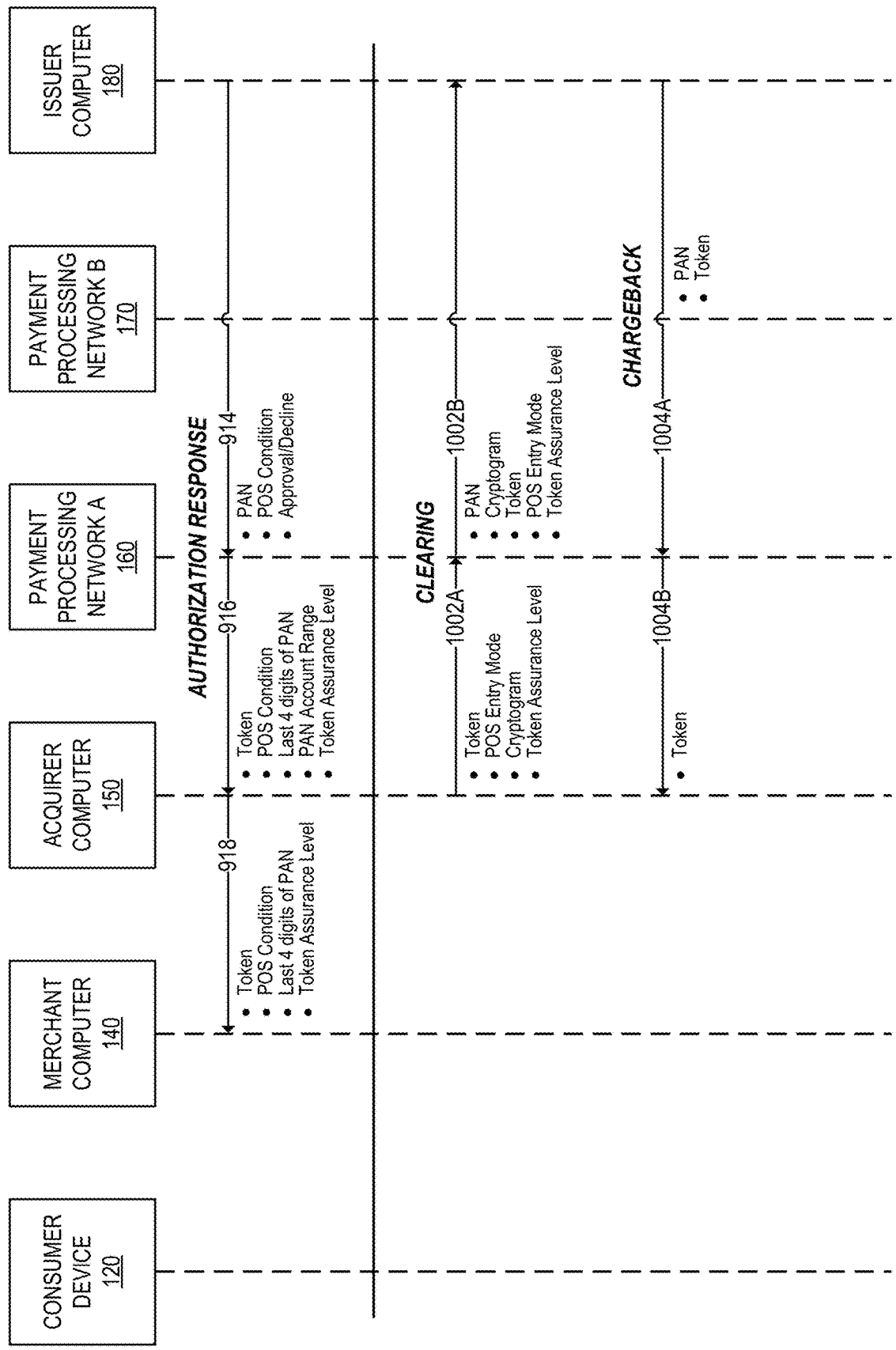
FIG. 10 shows flow diagrams for authorization response, clearing, and chargeback processes for a transaction according to an embodiment of the invention.

Moving to FIG. 10, at step 914, the issuer computer 180 may make an approval decision after receiving the modified authorization request message and send an authorization response message to the payment processing network A 160. The authorization response message may identify the account (e.g., PAN) and include the authorization decision for the transaction. Although not shown in FIG. 10, the token related fields described for the authorization request message (e.g., token assurance level) may be retained (e.g., stored at the issuer computer/database) and returned in the authorization response message.

At step 916, the payment processing network A 160, upon receiving the response, may swap the PAN for the token using the methods and processes described herein, may populate the authorization response message with the last four digits of the PAN (so the consumer may be assured that the correct account was used in the transaction), and may include the token assurance level in the modified authorization response message to the acquirer computer 150. The modified authorization response message may also include a PAN product identifier (i.e., PAN account range) to inform the acquirer as to any loyalty or special deals, offers, etc. associated with the account.

At step 918, the acquirer computer 150 may forward the authorization response message to the merchant computer 140 which may include the authorization decision for the transaction.

A transaction clearing process 1002 is also shown in FIG. 10. The clearing process 1002 may include steps 1002A-1002B as described below. In some embodiments, the clearing process may be performed by the clearing module 518 to reconcile the transaction.

At step 1002A, the acquirer computer 150 may submit a clearing draft message with the token in the PAN field, along with the token cryptogram (or other chip data) to the payment processing network A 160. The clearing draft message may also include a token assurance level.

At step 1002B, the payment processing network 160 may recognize the token and replace the token with the real account identifier (e.g., PAN) through similar processes to those described above involving payment processing network B 170 in the clearing draft to the issuer computer 180. The payment processing network A 160 may optionally place the token in a new field in the clearing draft message to the issuer computer 180 and also include the token assurance level in the clearing message.

A transaction chargeback process 1004 is also shown in FIG. 10. In some embodiments, the chargeback process may be performed by the clearing module 518.

At step 1004A, should a chargeback occur, the issuer computer 180 may retain and return the token as well as the PAN to the payment processing network A 160.

At step 1004B, the clearing process may move the token to the PAN field and drop the real PAN from the clearing draft message to the acquirer computer 150. Accordingly, the PAN associated with the token is kept secure while allowing charge-backs to occur for token related transactions The payment system 100 as discussed with different embodiments provides a platform that can be leveraged by external entities (e.g., third party wallets, e-commerce merchants, payment enablers/payment service providers, etc.) or internal payment processing network systems that have the need to use the token to facilitate payment transactions. In embodiments of the invention, a token can support interoperability and can be accepted, processed and routed by the entities within the payment system. Embodiments of the invention can help card issuers and merchants improve card security or enable new payment experiences through tokenization.

The various participants and elements described herein with reference to FIGS. 1 and 2 may operate one or more computer apparatuses to facilitate the functions described herein. Any of the elements in FIGS. 1 and 2, including any servers or databases, may use any suitable number of subsystems to facilitate the functions described herein.

III. Computer Apparatuses

Figure 11:
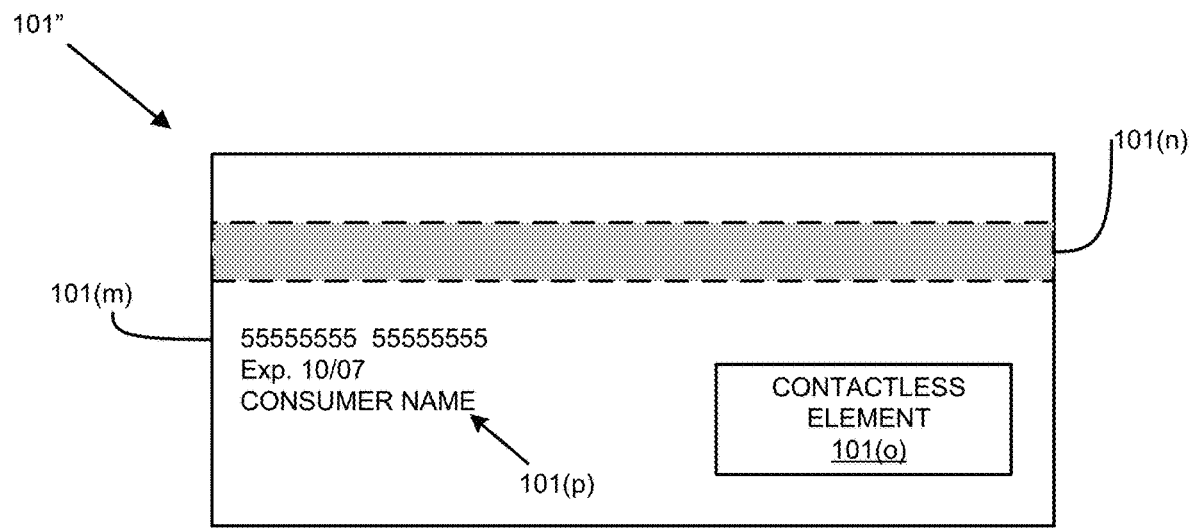
FIG. 11 shows an example of a consumer device according to some embodiments of the invention.

FIG. 11 shows an example of a payment device 101" in the form of a card. As shown, the payment device 101" comprises a plastic substrate 101(*m*). In some embodiments, a contactless element 101(*o*) for interfacing with an access device 102 may be present on, or embedded within, the plastic substrate 101(*m*). User information 101(*p*) such as an account number, expiration date, and/or a user name may be printed or embossed on the card. A magnetic stripe 101(*n*) may also be on the plastic substrate 101(*m*). In some embodiments, the payment device 101" may comprise a microprocessor and/or memory chips with user data stored in them.

As noted above and shown in FIG. 11, the payment device 101" may include both a magnetic stripe 101(*n*) and a contactless element 101(*o*). In some embodiments, both the magnetic stripe 101(*n*) and the contactless element 101(*o*) may be in the payment device 101". In some embodiments, either the magnetic stripe 101(*n*) or the contactless element 101(*o*) may be present in the payment device 101".

Figure 12:
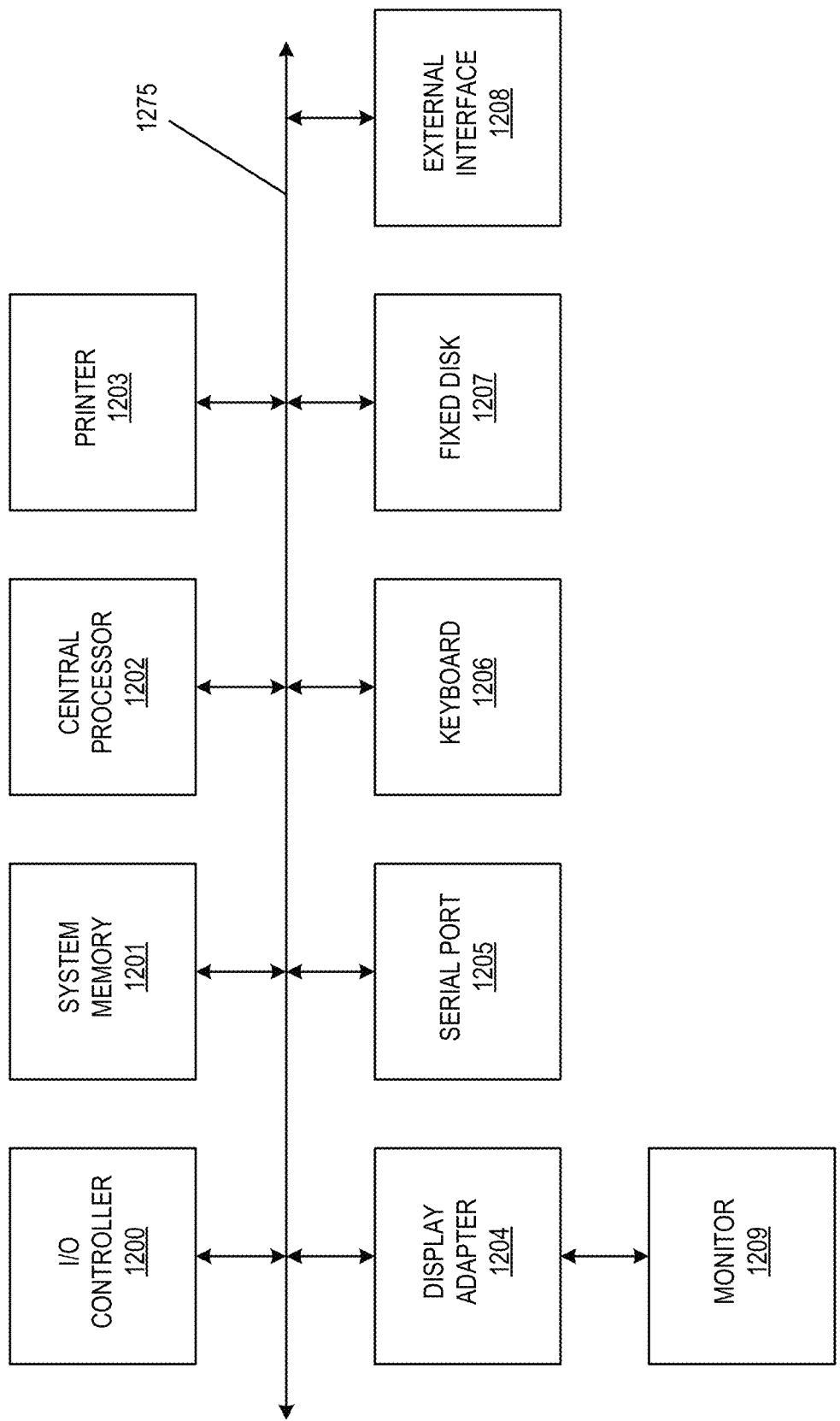
FIG. 12 shows a block diagram of a computer apparatus.

FIG. 12 is a high level block diagram of a computer system that may be used to implement any of the entities or components described above. The subsystems shown in FIG. 12 are interconnected via a system bus 1275. Additional subsystems include a printer 1203, keyboard 1206, fixed disk 1207, and monitor 1209, which is coupled to display adapter 1204. Peripherals and input/output (I/O) devices, which couple to I/O controller 1200, can be connected to the computer system by any number of means known in the art, such as a serial port. For example, serial port 1205 or external interface 1208 can be used to connect the computer apparatus to a wide area network such as the Internet, a mouse input device, or a scanner. The interconnection via system bus 1275 allows the central processor 1202 to communicate with each subsystem and to control the execution of instructions from system memory 1201 or the fixed disk 1207, as well as the exchange of information between subsystems. The system memory 1201 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A system comprising:
   a first payment network server computer;
   a network token system; and
   a token requestor computer comprising:
      a first processor; and a first non-transitory computer-readable storage medium comprising code executable by the first processor for implementing a method comprising:
  receiving a token and transaction data for a transaction associated with an account;
  generating an authorization request message for the transaction including the token and the transaction data, wherein the authorization request message further includes a token requestor identifier;
  transmitting the authorization request message to the first payment network server computer associated with a first payment network;
the first payment network server computer comprising:
  a second processor; and
  a second non-transitory computer-readable storage medium comprising code executable by the second processor for:
    identifying the network token system associated with the token based on a predetermined issuer identifier of the token by accessing a token mapping table comprising a plurality of network token systems and a plurality of predetermined issuer identifiers associated with the plurality of network token systems, the network token system being operated by a second payment network,
    sending a token verification request message to the network token system of the second payment network, the token verification request message including the token and the transaction data; and
the network token system comprising:
  a third processor; and
  a third non-transitory computer-readable storage medium comprising code executable by the third processor for:
    determining a primary account identifier associated with the token and validates the use of the token for the transaction, and
    validating the use of the token for the transaction, including validating the use of the token requestor identifier based on merchant restrictions retrieved from a token registry database, wherein the merchant restrictions restrict the token to particular merchants;
the first payment network server computer further configured for:
  receiving a token verification response message including the primary account identifier and a validation result from the network token system of the second payment network, and
  sending a modified authorization request message including the primary account identifier, the validation result, and the transaction data to an issuer of the account; and
the token requestor computer further configured for:
  receiving an authorization response message including an authorization decision for the transaction, wherein the authorization decision is based on the modified authorization request message.

2. The system of claim 1, wherein the authorization request message further includes an encrypted PIN block comprising a PIN associated with the account, and wherein the first payment network server computer further:
  determines an issuer PIN key using the primary account identifier; and
  validates the PIN using the determined issuer PIN key.

3. The system of claim 1, wherein the authorization request message further includes an encrypted PIN block comprising a PIN associated with the account, wherein the PIN block is generated based on the token, and wherein the first payment network server computer further:
  translates the PIN block to be based on the primary account identifier to generate a converted PIN block; and
  sends the converted PIN block to the issuer, wherein the issuer validates the PIN.

4. The system of claim 1, wherein the authorization request message further includes a token presentment mode, wherein the network token system of the second payment network validates the use of the token for the transaction using the token presentment mode.

5. The system of claim 1, wherein the authorization request message further includes a token assurance level code, wherein the token assurance level code indicates a level of confidence that the token was requested by an authorized entity, and wherein the validation result is determined using the token assurance level code.

6. The system of claim 1, wherein the second payment network is determined using a routing table, wherein the routing table associates each of a plurality of token issuer identifiers with a payment processing network.

7. The system of claim 1, the token requestor computer further configured for:
  determining the first payment network, of a plurality of payment processing networks, to use for the transaction.

8. The system of claim 1, wherein the authorization response message further comprises a token assurance level code, wherein the token assurance level code indicates a level of confidence that the token was requested by an authorized entity.

9. The system of claim 1, wherein the token requestor computer is a merchant computer.

10. A computer-implemented method comprising:
  receiving, by a token requestor computer, a token and transaction data for a transaction associated with an account;
  generating, by the token requestor computer, an authorization request message for the transaction including the token and the transaction data, wherein the authorization request message further includes a token requestor identifier;
  transmitting, by the token requestor computer, the authorization request message to a first payment network server computer associated with a first payment network;
  identifying, by the first payment network server computer, a network token system associated with the token based on a predetermined issuer identifier of the token, the network token system being operated by a second payment network by accessing a token mapping table comprising a plurality of network token systems and a plurality of predetermined issuer identifiers associated with the plurality of network token systems;
  sending, by the first payment network server computer, a token verification request message to the network token system of the second payment network, the token verification request message including the token and the transaction data;
  determining, by the network token system of the second payment network, a primary account identifier associated with the token and validates the use of the token for the transaction;
  validating, by the network token system of the second payment network, the use of the token for the transaction, including validating the use of the token requestor identifier based on merchant restrictions retrieved from a token registry database, wherein the merchant restrictions restrict the token to particular merchants;

sending, by the network token system of the first payment network, a modified authorization request message including the primary account identifier, a validation result, and the transaction data to an issuer of the account; and receiving, by the token requestor computer, an authorization response message including an authorization decision for the transaction, wherein the authorization decision is based on the modified authorization request message.

11. The method of claim 10, wherein the authorization request message further includes an encrypted PIN block comprising a PIN associated with the account, and wherein the first payment network server computer further:

validates the PIN using a determined issuer PIN key.

12. The method of claim 10, wherein the authorization request message further includes an encrypted PIN block comprising a PIN associated with the account, wherein the PIN block is generated based on the token, and wherein the first payment network server computer further:

translates the PIN block to be based on the primary account identifier to generate a converted PIN block; and sends the converted PIN block to the issuer, wherein the issuer validates the PIN.

13. The method of claim 10, wherein the authorization request message further includes a token presentment mode, wherein the network token system of the second payment network validates the use of the token for the transaction using the token presentment mode.

14. The method of claim 10, wherein the authorization request message further includes a token assurance level code, wherein the token assurance level code indicates a level of confidence that the token was requested by an authorized entity, and wherein the network token system of the second payment network validates the use of the token for the transaction using the token assurance level code.

15. The method of claim 10, wherein the second payment network is determined using a routing table, wherein the routing table associates each of a plurality of token issuer identifiers with a payment processing network.

16. The method of claim 10, further comprising:

determining, by the token requestor computer, the first payment network, of a plurality of payment processing networks, to use for the transaction.

* * * * *